United States Patent
Nesbitt et al.

(10) Patent No.: US 6,433,094 B1
(45) Date of Patent: *Aug. 13, 2002

(54) GOLF BALL COVERS CONTAINING HIGH ACID IONOMERS

(75) Inventors: R. Dennis Nesbitt, Westfield; Michael J. Sullivan, Chicopee, both of MA (US)

(73) Assignee: Spalding Sports Worldwide, Inc., Chicopee, MA (US)

(*) Notice: Subject to any disclaimer, the term of this patent is extended or adjusted under 35 U.S.C. 154(b) by 0 days.

This patent is subject to a terminal disclaimer.

(21) Appl. No.: 09/505,760

(22) Filed: Feb. 16, 2000

(Under 37 CFR 1.47)

Related U.S. Application Data

(63) Continuation-in-part of application No. 08/723,285, filed on Sep. 30, 1996, which is a continuation of application No. 08/264,997, filed on Jun. 24, 1994, now abandoned, which is a continuation of application No. 08/174,765, filed on Dec. 27, 1993, now abandoned, which is a continuation of application No. 07/776,803, filed on Oct. 15, 1991, now abandoned, application No. 09/505,760, which is a continuation-in-part of application No. 09/031,421, filed on Feb. 26, 1998, now abandoned, which is a continuation of application No. 08/412,051, filed on Mar. 28, 1995, now Pat. No. 6,150,470, which is a division of application No. 08/366,365, filed on Dec. 29, 1994, now abandoned, which is a continuation of application No. 07/901,660, filed on Jun. 19, 1992, now abandoned, said application No. 08/412,051, is a continuation-in-part of application No. 08/174,765, which is a continuation of application No. 07/776,803, application No. 09/505,760, which is a continuation-in-part of application No. 09/181,689, filed on Oct. 28, 1998, now Pat. No. 6,271,316, which is a continuation of application No. 09/102,342, filed on Jun. 22, 1998, which is a division of application No. 08/716,016, filed on Sep. 19, 1996, now Pat. No. 5,820,489, which is a division of application No. 08/255,442, filed on Jun. 8, 1994, now abandoned, which is a continuation of application No. 08/054,406, filed on Apr. 28, 1993, now Pat. No. 5,368,304.

(51) Int. Cl.[7] .......................... A63B 37/12; A63B 37/06
(52) U.S. Cl. .................. 525/221; 525/196; 525/201; 473/378; 473/385
(58) Field of Search ................................ 525/196, 201, 525/221; 473/378, 385

(56) References Cited

U.S. PATENT DOCUMENTS

| 3,454,676 A | 7/1969 | Busse |
| 3,472,825 A | 10/1969 | Walter et al. |
| 3,819,768 A | * 6/1974 | Molitor |
| 4,085,937 A | 4/1978 | Nesbitt |
| 4,090,716 A | 5/1978 | Martin et al. |
| 4,274,637 A | 6/1981 | Molitor |
| 4,431,193 A | 2/1984 | Schenk |
| 4,483,537 A | 11/1984 | Hanada et al. |
| 4,625,964 A | 12/1986 | Yamada |
| 4,714,253 A | 12/1987 | Nakahara et al. |
| 4,726,590 A | 2/1988 | Molitor |
| 4,848,770 A | 7/1989 | Shama |
| 4,852,884 A | 8/1989 | Sullivan |
| 4,884,814 A | 12/1989 | Sullivan |
| 4,911,451 A | 3/1990 | Sullivan et al. |
| 4,984,804 A | 1/1991 | Yamada et al. |
| 5,000,459 A | 3/1991 | Isaac |
| 5,068,151 A | 11/1991 | Nakamura |
| 5,098,105 A | 3/1992 | Sullivan |
| 5,120,791 A | 6/1992 | Sullivan |
| 5,187,013 A | 2/1993 | Sullivan |
| 5,209,485 A | 5/1993 | Nesbitt et al. |
| 5,222,739 A | 6/1993 | Horiuchi et al. |
| 5,244,969 A | 9/1993 | Yamada |
| 5,368,304 A | 11/1994 | Sullivan et al. |
| 5,580,057 A | 12/1996 | Sullivan et al. |
| 5,605,967 A | 2/1997 | Egashira et al. |
| 5,733,207 A | 3/1998 | Sullivan et al. |
| 5,820,489 A | * 10/1998 | Sullivan |
| 6,271,316 B1 | * 8/2001 | Sullivan |

FOREIGN PATENT DOCUMENTS

JP 63229077 9/1988

OTHER PUBLICATIONS

Cochran, *Science & Golf*; "Surlyn Ionomers for Golf Ball Covers", p 205–212; Jul. 1990.

RDO 207,003, Jan. 10, 1989, "Ionomers Obtained from Ethylene–Acrylic or Methacrylic Acid, Useful for Golf Balls, Footwear, Ski Boots, Cosmetic Bottle Cap Closures, Etc.".

* cited by examiner

Primary Examiner—David J. Buttner

(57) ABSTRACT

The present invention is directed to a golf ball comprising a core and a cover, wherein the cover comprises a blend of two or more high acid ionomer resins. Each high acid ionomer resin utilized in the blend of the cover composition comprises generally of greater than 16% by weight acid, preferably from about 17 to about 25% by weight acid and more preferably from about 18.5% to about 21.5% by weight acid. The acid groups of the high acid ionomers utilized in the cover compositions of the invention are partially (i.e. generally 10–75 percent, preferably 30–70 percent) neutralized by metal ions such as by sodium, zinc and magnesium ions. When the blend of two or more high acid ionomer resins is utilized to manufacture a golf ball, the golf ball produced thereby, exhibits properties of improved distance without sacrificing characteristics such as playability and/or durability when compared to low acid ionomer and/or low acid/high acid ionomer blends. In addition, the present invention is also directed to a golf ball comprising a soft core and a hard cover comprising a blend of high acid ionomer resins to produce a resulting molded golf ball having a reduced spin rate. The low spin golf ball of the present invention has an enlarged diameter which serves to further reduce spin rate. The resulting golf ball exhibits properties of reduced spin without sacrificing durability, playability and resilience.

19 Claims, No Drawings

GOLF BALL COVERS CONTAINING HIGH ACID IONOMERS

This application is a continuation-in-part of U.S. application Ser. No. 08/723,285, filed Sep. 30, 1996, which is a continuation of U.S. application Ser. No. 08/264,997, filed Jun. 24, 1994 (abandoned) which is a continuation of U.S. application Ser. No. 08/174,765, filed Dec. 27, 1993 (abandoned) which is a continuation of U.S. application Ser. No. 07/776,803, filed Oct. 15, 1991 (abandoned); and this application is also a continuation-in-part of U.S. application Ser. No. 09/031,421, filed Feb. 26, 1998 (abandoned), which is a continuation of U.S. application Ser. No. 08/412,051, filed Mar. 28, 1995 (now U.S. Pat. No. 6,150,470), which is a divisional of U.S. application Ser. No. 08/366,365, filed Dec. 29, 1994 (abandoned), which is a continuation of U.S. application Ser. No. 07/901,660, filed Jun. 19, 1992 (abandoned); and U.S. application Ser. No. 08/412,051 is also a continuation-in-part of U.S. application Ser. No. 08/174,765, filed Dec. 27, 1993 (abandoned) which is a continuation of U.S. application Ser. No. 07/776,803, filed Oct. 15, 1991 (abandoned); and this application is a continuation-in-part of U.S. application Ser. No. 09/181,689, filed Oct. 28, 1998 (now U.S. Pat. No. 6,271,316), which is a continuation of U.S. application Ser. No. 09/102,342, filed Jun. 22, 1998, which is a divisional of U.S. application Ser. No. 08/716,016, filed Sep. 19, 1996 (now U.S. Pat. No. 5,820,489), which is a divisional of U.S. application Ser. No. 08/255,442, filed Jun. 8, 1994 (abandoned), which is a continuation of U.S. application Ser. No. 08/054,406, filed Apr. 28, 1993 (now U.S. Pat. No. 5,368,304).

FIELD OF THE INVENTION

The present invention relates to golf balls and, more particularly, to improved golf ball covers made from blends of specific high acid ionomers. The improved golf ball covers are useful for producing golf balls, particularly multi-piece balls, exhibiting enhanced travel distance while maintaining the playability and/or durability characteristics necessary for repetitive play.

The present invention also relates to golf balls and, more particularly, to improved two-piece golf balls having low spin rates. The improvement in the golf balls results from a combination of a softened polybutadiene core and a hard cover made from blends of two or more specific hard, high stiffness ionomers. The combination of a soft core and a hard cover leads to an improved golf ball having a lower than anticipated spin rate while maintaining the resilience and durability characteristics necessary for repetitive play.

In an additional embodiment of the invention, the spin rate is further reduced by decreasing the weight of the softened polybutadiene core while maintaining core size and by increasing the thickness of the cover. The larger, less dense finished ball exhibits lower spin rates after club impact than conventional balls.

BACKGROUND OF THE INVENTION

Ionomeric resins are polymers containing interchain ionic bonding. As a result of their toughness, durability, and flight characteristics, various ionomeric resins sold by E.I. DuPont de Nemours & Company under the trademark "Surlyn®" and more recently, by the Exxon Corporation (see U.S. Pat. No. 4,911,451) under the trademarks "Escor®" and the tradename "Iotek", have become the materials of choice for the construction of golf ball covers over the traditional "balata" (trans polyisoprene, natural or synthetic) rubbers. The softer balata covers, although exhibiting enhanced playability properties, lack the durability properties required for repetitive play.

Ionomeric resins are generally ionic copolymers of an olefin, such as ethylene, and a metal salt of an unsaturated carboxylic acid, such as acrylic acid, methacrylic acid or maleic acid. In some instances, an additional softening comonomer such as an acrylate can also be included to form a terpolymer. The pendent ionic groups in the ionomeric resins interact to form ion-rich aggregates contained in a non-polar polymer matrix. The metal ions, such as sodium, zinc, magnesium, lithium, potassium, calcium, etc. are used to neutralize some portion of the acid groups in the copolymer resulting in a thermoplastic elastomer exhibiting enhanced properties, i.e. improved durability, etc. for golf ball construction over balata.

The ionomeric resins utilized to produce cover compositions can be formulated according to known procedures such as those set forth in U.S. Pat. No. 3,421,766 or British Patent No. 963,380, with neutralization effected according to procedures disclosed in Canadian Patent Nos. 674,595 and 713,631, wherein the ionomer is produced by copolymerizing the olefin and carboxylic acid to produce a copolymer having the acid units randomly distributed along the polymer chain. Broadly, the ionic copolymer generally comprises one or more α-olefins and from about 9 to about 20 weight percent of α, β-ethylenically unsaturated mono- or dicarboxylic acid, the basic copolymer neutralized with metal ions to the extent desired. Usually, at least 20% of the carboxylic acid groups of the copolymer are neutralized by the metal ions (such as sodium, potassium, zinc, calcium, magnesium, and the like) and exist in the ionic state.

In this regard, generally at least 20% of the carboxylic acid groups of the copolymer are neutralized by the metal ions (such as sodium, potassium, zinc, calcium, magnesium, and the like) and exist in the ionic state. Suitable olefins for use in preparing the ionomeric resins include ethylene, propylene, butene-1, hexene-1, and the like. Unsaturated carboxylic acids include acrylic, methacrylic, ethacrylic, α-chloroacrylic, crotonic, maleic, fumaric, itaconic acids, and the like. The ionomeric resins utilized in the golf ball industry are generally copolymers of ethylene with acrylic (i.e. Escor®) and/or methacrylic (i.e. Surlyn®) acid. In addition, two or more types of ionomeric resins may be blended into the cover compositions in order to produce the desired properties of the resulting golf balls.

Along this line, the properties of the cover compositions and/or the ionomeric resins vary according to the type and amount of the metal cation, the molecular weight, the composition of the base resin (i.e. the nature of the relative content of the olefin, the unsaturated carboxylic acid groups, etc.), the amount of acid, the degree of neutralization and whether additional ingredients such as reinforcement agents or additives are utilized. Consequently, the properties of the ionomer resins can be controlled and varied in order to produce golf balls having different playing characteristics, such as differences in hardness, playability (i.e. spin, feel, click, etc.), durability (i.e. impact and/or cut resistance), and resilience (i.e. coefficient of restitution).

However, while there are currently more than fifty commercial grades of ionomers available from DuPont and Exxon with a wide range of properties which vary according to the type and amount of metal cations, molecular weight, composition of the base resin (i.e. relative content of ethylene and methacrylic and/or acrylic acid groups), the degree of neutralization and additive ingredients such as reinforcement agents, etc., a great deal of research continues in order to develop golf ball cover compositions exhibiting not only the playability characteristics previously associated with the balata cover, but also the improved impact resistance and carrying distance properties produced by the ionomeric resins. Thus, an object of the present invention is to provide golf ball cover compositions which, when utilized in golf ball construction, produce balls exhibiting improved travel distance while maintaining satisfactory playability and durability properties.

In enhancing the distance a golf ball will travel when hit, there are a variety of factors which are considered. The coefficient of restitution, along with ball size, weight and additional factors such as club head speed, angle of trajectory, and ball aerodynamics (i.e., dimple pattern), generally determine the distance a ball will travel when hit. Since club head speed and the angle of trajectory are not factors easily controllable, particularly by golf ball manufacturers, the factors of concern among manufacturers are the coefficient of restitution and the surface dimple pattern of the ball.

A golf ball's coefficient of restitution (C.O.R.) is the ratio of the relative velocity of the ball after direct impact to that before impact. One way to measure the coefficient of restitution is to propel a ball at a given speed against a hard massive surface, and measure its incoming velocity and outgoing velocity. The coefficient of restitution is defined as the ratio of the outgoing velocity to incoming velocity of a rebounding ball and is expressed as a decimal. As a result, the coefficient of restitution can vary from zero to one, with one being equivalent to an elastic collision and zero being equivalent to an inelastic collision.

The coefficient of restitution of a one-piece golf ball is a function of the ball's composition. In a two-piece or a multi-layered golf ball, the coefficient of restitution is a function of the core, the cover and any additional layer. While there are no United States Golf Association (U.S.G.A.) limitations on the coefficient of restitution values of a golf ball, the U.S.G.A. requires that the golf ball cannot exceed an initial velocity of 255 feet/second. As a result, golf ball manufacturers generally seek to maximize the coefficient of restitution of a ball without violating the velocity limitation.

In various attempts to produce a high coefficient of restitution golf ball exhibiting the enhanced travel distance desired, the golfing industry has blended various ionomeric blends. However, many of these blends do not exhibit the durability and playability characteristics necessary for repetitive play and/or the enhanced travel distance desired.

The present invention is directed to the discovery that specific ionomer resins containing relative high amounts of acid (i.e. greater than 16 weight percent acid, preferably from about 17 to about 25 weight percent acid, and more preferably from about 18.5 to about 21.5 weight percent) and partially neutralized with sodium, zinc and magnesium ions, produce, when blended and melt processed according to the parameters set forth below, cover compositions exhibiting enhanced coefficient of restitution values when compared to low acid ionomers, or blends of low acid ionomer resins containing 16 weight percent acid or less. The new high acid ionomer cover compositions produce golf balls which exhibit properties of enhanced carrying distance (i.e. possess higher coefficient of restitution values) over known ionomer blends such as those set forth in U.S. Pat. Nos. 4,884,814 and 4,911,451, without sacrificing desirable characteristics such as playability and/or durability Along this line, until relatively recently, all of the ionomer resins commercially available contained at most 15 to 16 weight percent carboxylic acid. In 1989, Dupont introduced a number of new high acid ionomers and suggested that these new ionomers may have some use in previously known low acid ionomer applications such as the production of shoe soles, box toes, bowling pins, golf balls, ski boots, auto trim, etc.

Furthermore, Dupont suggested in a research disclosure (E.I. DuPont de Nemours & Co., Research Disclosure No. 297,003) that ionomers produced from polymers of ethylene acrylic acid or methacrylic acid containing greater than 15 weight percent acid can be melt processed to produce articles (i.e. golf balls, foot wear, ski boots, cosmetic bottle cap closures and so on) with good properties (i.e. improved stiffness, hardness and clarity) when compared with ionomers with lower acid levels.

However, not only has little information been provided concerning the acid levels and types of effective ionomers, particularly with respect to the art of golf ball manufacturing, it has been found that many cover compositions produced from polymers of ethylene/acrylic acid or ethylene/methacrylic acid containing greater than 15 weight percent acid have been dissatisfactory in that these compositions exhibit processing problems or are generally short on distance and/or durability and thus, are not particularly commercially viable. Similar poor results have been produced with covers composed of blends of high and low acid ethylene/acrylic acid or ethylene/methacrylic acid polymers and/or covers produced from single high acid ionomers.

However, notwithstanding the above difficulties, it has been discovered that improved golf ball covers can be produced from specific blends of high acid ionomers (i.e. ionomer resins containing greater than 16 weight percent acid, preferably from about 17 to about 25 weight percent acid, and more preferably from about 18.5 to about 21.5 weight percent acid) which do not exhibit the processing, distance and/or durability limitations demonstrated by the prior art.

In this regard, it has been found that blends of specific high acid ionomer resins, particularly blends of sodium and zinc high acid ionomers, as well as blends of sodium and magnesium high acid ionomers, extend, when utilized in golf ball cover construction, the range of hardness beyond that previously obtainable while maintaining the beneficial properties (i.e. durability, click, feel, etc.) of the softer low acid ionomers disclosed in U.S. Pat. Nos. 4,884,814 and 4,911,451. These blends produce harder, stiffer golf balls having higher C.O.R.s, and thus longer distance. This discovery is the subject matter of U.S. application Ser. No. 776,803, filed on Oct. 15, 1991, and now abandoned.

The present invention is directed to the development of a number of new high acid ionomers, particularly new metal cation neutralized acrylic acid based high acid ionomer resins, which exhibit, when utilized for golf ball cover construction, cover compositions having further improved hardness and resilience (C.O.R.) properties. The new metal cation neutralized acrylic acid based high acid ionomer resins, as well as specific blends of these resins, are particularly valuable in the field of golf ball production.

Furthermore, as a result of the development of a number of new acrylic acid based high acid ionomers neutralized to various extents by several different types of metal cations, such as by manganese, lithium, potassium, calcium and nickel cations, several new high acid ionomers and/or high acid ionomer blends besides sodium, zinc and magnesium high acid ionomers or ionomer blends are now available for golf ball cover production. It has been found that many of these new cation neutralized high acid ionomer blends produce cover compositions exhibiting enhanced resilience (i.e. longer distance) due to synergies which occur during processing. Consequently, the new metal cation neutralized acrylic acid based high acid ionomer resins of the present invention may be blended to produce substantially harder golf balls having higher C.O.R.'s than those produced by the low acid ionomer covers presently commercially available.

The present invention is also directed to improved golf ball covers made from specific blends of two or more high acid ionomers which do not exhibit the processing, distance and/or durability limitations demonstrated by the prior art. It has been found that these difficulties can be overcome utilizing the improved high acid ionomer blends of the present invention.

An additional embodiment of the invention realtes to a golf ball having a low spin rate. The high acid ionomer blends of the invention as described above, when used in combination with a relatively softer core material, produces golf balls having a low spin rate.

Spin rate is an important golf ball characteristic for both the skilled and unskilled golfer. High spin rates allow for the more skilled golfer, such as PGA professionals and low handicap players, to maximize control of the golf ball. This is particularly beneficial to the more skilled golfer when hitting an approach shot to a green. The ability to intentionally produce "back spin", thereby stopping the ball quickly on the green, and/or "side spin" to draw or fade the ball, substantially improves the golfer's control over the ball. Thus, the more skilled golfer generally prefers a golf ball exhibiting high spin rate properties.

However, a high spin golf ball is not desirous by all golfers, particularly high handicap players who cannot intentionally control the spin of the ball. In this regard, less skilled golfers, have, among others, two substantial obstacles to improving their game: slicing and hooking. When a club head meets a ball, an unintentional side spin is often imparted which sends the ball off its intended course. The side spin reduces one's control over the ball as well as the distance the ball will travel. As a result, unwanted strokes are added to the game.

Consequently, while the more skilled golfer desires a high spin golf ball, a more efficient ball for the less skilled player is a golf ball that exhibits low spin properties. The low spin ball reduces slicing and hooking and enhances roll distance for the amateur golfer.

The present inventors have addressed the need for developing a golf ball having a reduced spin rate after club impact, while at the same time maintaining durability, playability and resiliency characteristics needed for repeated use. The reduced spin rate golf ball of the present invention meets the rules and regulations established by the United States Golf Association (U.S.G.A.).

Along these lines, the U.S.G.A. has set forth five (5) specific regulations that a golf ball must conform to. The U.S.G.A. rules require that a ball be no smaller than 1.680 inches in diameter. However, notwithstanding this restriction, there is no specific limitation as to the maximum permissible diameter of a golf ball. As a result, a golf ball can be as large as desired so long as it is larger than 1.680 inches in diameter and so long as the other four (4) specific regulations are met.

The U.S.G.A. rules also require that balls weigh no more than 1.620 ounces, and that their initial velocity may not exceed 250 feet per second with a maximum tolerance of 2%, or up to 255 ft./sec. Further, the U.S.G.A. rules state that a ball may not travel a distance greater than 280 yards with a test tolerance of 6% when hit by the U.S.G.A. outdoor driving machine under specific conditions.

It has been determined by the present inventors that the combination of a relatively soft core (i.e. Riehle compression of about 0.075 to 0.115) and a hard cover (i.e. Shore D hardness of 65 or more) significantly reduces the overall spin rate of the resulting two piece golf ball. The inventors have also learned that an increase in cover thickness, thereby increasing the overall diameter of the resulting molded golf ball, further reduces spin rate.

Top-grade golf balls sold in the United States may be generally classified as one of two types: two-piece or three-piece balls. The two-piece ball, exemplified by the balls sold by Spalding & Evenflo Companies, Inc. (the assignee of the present invention through its wholly owned subsidiary, Lisco, Inc.) under the trademark TOP-FLITE, consists of a solid polymeric core and a separately formed outer cover. The so-called three-piece balls, exemplified by the balls sold under the trademark TITLEIST by the Acushnet Company, consist of a liquid (e.g., TITLEIST TOUR 384) or solid (e.g., TITLEIST DT) center, elastomeric thread windings about the center, and a cover.

Spalding's two-piece golf balls are produced by molding a natural (balata) or synthetic (i.e. thermoplastic resin such as an ionomer resin) polymeric cover composition around a preformed polybutadiene (rubber) core. During the molding process, the desired dimple pattern is molded into the cover material. In order to reduce the number of coating steps involved in the finishing of the golf balls, a color pigment or dye and, in many instances, an optical brightener, are added directly to the generally "off white" colored polymeric cover composition prior to molding. By incorporating the pigment and/or optical brightener in the cover composition molded onto the golf ball core, this process eliminates the need for a supplemented pigmented painting step in order to produce a white or colored (notably orange, pink and yellow) golf ball.

With respect to multi-layered golf balls, Spalding is the leading manufacturer of two-piece golf balls in the world. Spalding manufactures over sixty (60) different types of two-piece balls which vary distinctly in such properties as playability (i.e. spin rate, compression, feel, etc.), travel distance (initial velocity, C.O.R., etc.), durability (impact, cut and weather resistance) and appearance (i.e. whiteness, reflectance, yellowness, etc.) depending upon the ball's core, cover and coating materials, as well as the ball's surface configuration (i.e. dimple pattern). Consequently, Spalding's two-piece golf balls offer both the amateur and professional golfer a variety of performance characteristics to suit an individual's game.

In regard to the specific components of a golf ball, although the nature of the cover can, in certain instances, make a significant contribution to the overall feel, spin (control), coefficient of restitution (C.O.R.) and initial velocity of a ball (see, for example, U.S. Patent 3,819,768 to Molitor), the initial velocity of two-piece and three-piece balls is determined mainly by the coefficient of restitution of the core. The coefficient of restitution of the core of wound (i.e. three-piece) balls can be controlled within limits by regulating the winding tension and the thread and center composition. With respect to two-piece balls, the coefficient of restitution of the core is a function of the properties of the elastomer composition from which it is made.

The cover component of a golf ball is particularly influential in effecting the compression (feel), spin rates (control), distance (C.O.R.), and durability (i.e. impact resistance, etc.) of the resulting ball. Various cover compositions have been developed by Spalding and others in order to optimize the desired properties of the resulting golf balls.

Over the last twenty (20) years, improvements in cover and core material formulations and changes in dimple patterns have more or less continually improved golf ball distance. Top-grade golf balls, however, must meet several other important design criteria. To successfully compete in today's golf ball market, a golf ball should be resistant to cutting and must be finished well; it should hold a line in putting and should have good click and feel. In addition, the ball should exhibit spin and control properties dictated by the skill and experience of the end user.

The present invention is directed to improved top-grade golf balls having reduced spin rates. The improved golf balls offer the less skilled golfer better control over his or her shots and allow for greater distance.

In an alternative embodiment, the spin rate of the ball is further reduced by increasing the thickness of the cover and/or decreasing the weight and softness of the core. By increasing the cover thickness and/or the overall diameter of the resulting molded golf ball, enhanced reduction in spin rate is observed.

With respect to the increased size of the ball, over the years golf ball manufacturers have generally produced golf balls at or around the minimum size and maximum weight specifications set forth by the U.S.G.A. There have, however, been exceptions, particularly in connection with the manufacture of golf balls for teaching aids. For example, oversized, overweight (and thus unauthorized) golf balls have been on sale for use as golf teaching aids (see U.S. Pat. No. 3,201,384 to Barber).

Oversized golf balls are also disclosed in New Zealand Patent 192,618 dated Jan. 1, 1980, issued to a predecessor of the present assignee. This patent teaches an oversize golf ball having a diameter between 1.700 and 1.730 inches and an oversized core of resilient material (i.e. about 1.585 to 1.595 inches in diameter) so as to increase the coefficient of restitution. Additionally, the patent discloses that the ball should include a cover having a thickness less than the cover thickness of conventional balls (i.e. a cover thickness of about 0.050 inches as opposed to 0.090 inches for conventional two-piece balls).

In addition, it is also noted that golf balls made by Spalding in 1915 were of a diameter ranging from 1.630 inches to 1.710 inches. As the diameter of the ball increased, the weight of the ball also increased. These balls were comprised of covers made up of balata/gutta percha and cores made from solid rubber or liquid sacs and wound with elastic thread.

Golf balls known as the LYNX JUMBO were also commercially available by Lynx in October, 1979. These balls had a diameter of 1.76 to 1.80 inches. It met with little or no commercial success. The LYNX JUMBO balls consisted of a core comprised of wound core and a cover comprised of natural or synthetic balata.

However, notwithstanding the enhanced diameters of these golf balls, none of these balls produced the enhanced spin reduction characteristics and overall playability, distance and durability properties of the present invention and/or fall within the regulations set forth by the U.S.G.A. An object of the present invention is to produce a U.S.G.A. regulation golf ball having improved low spin properties while maintaining the resilience and durability characteristics necessary for repetitive play.

These and other objects and features of the invention will be apparent from the following description and from the claims.

SUMMARY OF THE INVENTION

In one aspect, the present invention is directed to a golf ball comprising a core and a cover, wherein the cover comprises a blend of two or more high acid ionomer resins. Each high acid ionomer resin utilized in the blend of the cover composition comprises generally greater than 16% by weight acid, preferably from about 17 to about 25% by weight acid and more preferably from about 18.5% to about 21.5% by weight acid. The acid groups of the high acid ionomers utilized in the cover compositions of the invention are partially (i.e. generally 10–75 percent, preferably 30–70 percent) neutralized by metal ions such as by sodium, zinc and magnesium ions. When the blend of two or more high acid ionomer resins is utilized to manufacture a golf ball, the golf ball produced thereby, exhibits properties of improved distance without sacrificing characteristics such as playability and/or durability when compared to low acid ionomer and/or low acid/high acid ionomer blends.

In another aspect, the invention relates to a golf ball comprising a core and a cover, wherein the cover comprises a blend of at least two high acid ionomer resins. Each high acid ionomer resin is comprised of an ethylene-methacrylic acid copolymer or an ethylene-acrylic acid copolymer containing greater than 16% by weight acid, preferably from about 17 to about 25% by weight acid, and more preferably from about 18.5 to about 21.5% by weight acid, with from about 10% to about 75% by weight (preferably from about 30% to about 70% by weight) of the carboxylic acid groups neutralized by metal ions such as by sodium, zinc or magnesium ions. Preferably, although not necessarily, the high acid ionomers utilized to produce the cover compositions of the invention have the same type of monocarboxylic acid (i.e. both are methacrylic acid or acrylic acid type high acid ionomers).

In addition, the cover may consist of one or more additional ingredients such as pigments, dyes, U.V. absorbers and optical brighteners.

In a further aspect, the present invention concerns a golf ball comprising a core and a cover, wherein the cover is comprised of a blend of an ethylene-methacrylic acid copolymer containing greater than 16% by weight methacrylic acid, preferably from about 17% to about 25% by weight methacrylic acid, and more preferably 18.5% to about 21.5% by weight methacrylic acid, having from about 10% to about 75% of the carboxylic acid groups neutralized with sodium ions, and an ethylene-methacrylic acid copolymer containing greater than 16% by weight methacrylic acid, preferably from about 17% to about 25% by weight methacrylic acid, and more preferably 18.5% to about 21.5% by weight methacrylic acid, having from about 10% to about 75% of the carboxylic acid groups neutralized with zinc or magnesium ions. The ratio of sodium-high acid ethylene-methacrylic acid based ionomer to zinc or magnesium-high acid ethylene-methacrylic acid based ionomer is from about 90% to about 10% and from about 10% to about 90%. A more preferred range is from about 75% to about 25% and from about 25% to about 75%.

In a still another aspect, the invention relates to a golf ball comprising a core and a cover, wherein the cover comprises a blend of an ethylene-acrylic acid copolymer containing greater than 16% by weight acrylic acid, preferably from about 17 to about 25% by weight acrylic acid, and more preferably from about 18.5% to about 21.5% by weight acrylic acid, having from about 10% to about 75% of the carboxylic acid groups neutralized with sodium ions, and of an ethylene-acrylic acid copolymer containing greater than 16% by weight acrylic acid, preferably from about 17 to about 25% by weight acrylic acid, and more preferably from about 18.5% to about 21.5% by weight acrylic acid, having from about 10 to about 75% of the carboxylic acid groups neutralized with zinc or magnesium ions. The ratio of sodium-high acid ethylene-acrylic acid based ionomer to zinc or magnesium-high acid ethylene acrylic acid based ionomer is from 90% to about 10% and from 10% to about 90%. A more preferred range is from about 75% to about 25% and from about 25% to about 75%.

In a still further aspect, the invention is directed to a cover composition comprised of two or more high acid ionomer resins, wherein each high acid ionomer resin is comprised generally of greater than 16% by weight acid, preferably about 17 to about 25% by weight acid and more preferably from about 18.5% to about 21.5% by weight acid, and wherein each high acid ionomeric resin is from about 10 to about 75% by weight neutralized by metal ions such as by sodium, zinc and magnesium ions. The high acid ionomer resins produce, when blended and molded around solid or wound cores to formulate a cover composition, golf balls exhibiting enhanced distance (i.e. improved C.O.R.) without adversely affecting the balls' playability and/or durability characteristics.

In a still further aspect, the present invention is directed to new metal cation neutralized high acid ionomer resins comprising a copolymer of greater than 16% by weight of an alpha, beta-unsaturated carboxylic acid (preferably from about 17% to about 25% by weight acid, and more preferably from about 18.5% to about 21.5% by weight acid) and an alpha-olefin, of which about 10% to about 90% of the carboxyl groups of the copolymer are neutralized with a metal cation selected from the group consisting of manganese, lithium, potassium, calcium and nickel.

In another aspect, the invention relates to metal cation neutralized high acid ionomer resins comprising a copolymer of about 20% by weight of an alpha, beta-unsaturated carboxylic acid (preferably acrylic acid) and an olefin (preferably ethylene), of which about 10% to about 90% of the carboxyl groups of the copolymer are neutralized with a metal cation selected from the group consisting of manganese, lithium, potassium, calcium and nickel.

In a further aspect, the present invention concerns a metal cation neutralized high acid ionomer resins comprising a copolymer of about 20% by weight acrylic acid with the remainder, or balance, thereof being ethylene, of which 10% to 90% of the carboxyl groups of the copolymer are neutralized with a metal cation selected from the group consisting of manganese, lithium, potassium, magnesium, calcium and nickel.

In still another aspect, the invention is directed to a metal cation neutralized high acid ionomer resin comprising a copolymer of about 20% by weight acrylic acid and the remainder ethylene, of which 10% to 90% of the carboxyl groups of the copolymer are neutralized with a metal cation selected from the group consisting of sodium, manganese, lithium, potassium, zinc, magnesium, calcium and nickel. The metal cation neutralized high acid ionomer resin produces, when blended and molded around solid or wound cores to form a cover composition, golf balls exhibiting enhanced resilience (i.e. improved C.O.R.) without adversely affecting the ball's playability and/or durability characteristics.

In an additional aspect, the invention relates to a method for producing metal cation neutralized high acid ionomer resins comprising the steps of providing a copolymer comprised of greater than 16% by weight of an alpha, beta-unsaturated carboxylic acid and an olefin; and neutralizing from about 10% to about 90% of the carboxylic acid groups of the copolymer with a metal cation selected from the group consisting of manganese, lithium, potassium, calcium and nickel. The metal cation neutralized high acid ionomer resins produced by this method are also provided.

In another aspect, the present invention concerns a process for producing metal cation neutralized acrylic acid based high acid ionomer resins comprising the steps of providing a copolymer made of about 20% by weight of acrylic acid and the balance ethylene, and neutralizing from about 10% to about 90% of the carboxylic acid groups of the copolymer with a metal cation selected from the group consisting of manganese, lithium, potassium, magnesium, calcium and nickel. The new metal cation neutralized high acid ionomer resins produced by this method are also provided.

In still a further aspect, the invention is directed to a golf ball comprising a core and a cover, wherein the cover is comprised of a metal cation neutralized high acid ionomer resin which is a copolymer of greater than 16% by weight of an alpha, beta-unsaturated carboxylic acid, (preferably from about 17% to about 25% by weight acid, and more preferably from about 18.5% to about 21.5% by weight acid) and an olefin, of which 10% to 90% of the carboxyl groups of the copolymer are neutralized with a metal cation selected from the group consisting of manganese, lithium, potassium, calcium and nickel. In addition, the cover may contain of one or more additional ingredients such as pigments, dyes, U.V. absorbers and optical brighteners.

In another further aspect, the invention relates to a golf ball comprising a core and a cover, wherein the cover is comprised of a metal cation neutralized ionomer resin which is a copolymer of about 20% by weight of an acrylic acid and the remainder ethylene, of which 10% to 90% of the carboxyl groups of the acrylic acid/ethylene copolymer are neutralized with a metal cation selected from the group consisting of manganese, lithium, potassium, magnesium, calcium and nickel. The core is generally a solid core, and additional ingredients such as pigments, dyes, U.V. absorbers and optical brighteners may be included in the cover.

In a further additional aspect, the invention is directed to a golf ball comprising a core and a cover, wherein the cover is a blend of two or more metal cation neutralized high acid ionomer resins, each ionomer resin comprised of about 20% by weight of acrylic acid and the remainder ethylene, of which about 10% to about 90% of the carboxyl groups of the copolymer are neutralized with a metal cation. The metal cation of each resin is a cation selected from the group consisting of sodium, manganese, lithium, potassium, zinc, magnesium, calcium and nickel. In this regard, diblends consisting of sodium/manganese, sodium/lithium, sodium/zinc, sodium/magnesium, sodium/calcium, manganese/potassium, lithium/zinc, lithium/magnesium, lithium/calcium, and potassium/magnesium neutralized 20% acrylic acid/ethylene ionomer resins and triblends consisting of zinc/lithium/potassium, sodium/zinc/lithium, sodium/manganese/calcium, sodium/potassium/manganese, and sodium/potassium/magnesium neutralized 20% acrylic acid/ ethylene ionomer resins are the more preferred blends which comprise the cover component of the invention.

An additional aspect of the present invention is directed to improved golf balls having a low rate of spin upon club impact. The golf balls comprise a soft polybutadiene core and a hard cover. The hard cover is preferably sized to be larger than conventional diameters. The low spin rate enables the ball to travel a greater distance. In addition, the low spin rate provides the less skilled golfer with more control. This is because the low spin rate decreases undesirable side spin which leads to slicing and hooking. The combination of a hard cover and a soft core provides for a ball having a lower than anticipated spin rate while maintaining high resilience and good durability.

The golf ball comprises a core and a cover. The core has a Riehle compression of at least 0.075, preferably 0.075 to about 0.115, and a PGA compression of about 45 to 85. The cover has a Shore D hardness of at least 65.

In an alternative embodiment, the resulting ball is larger than the standard 1.680 inch golf ball. Its diameter is in the range of about 1.680 to 1.800 inches, more likely in the range of about 1.700 to 1.800 inches, preferably in the range of 1.710–1.730 inches, and most preferably in the range of about 1.717–1.720 inches. The larger diameter of the golf ball results from the cover thickness which ranges from more than the standard 0.0675 inches up to about 0.130, preferably from about 0.0675 to about 0.1275 inches, more preferably in the range of about 0.0825 to 0.0925, and most preferably in the range of about 0.0860 to 0.0890 inches. The core is of a standard size, roughly about 1.540 to 1.545 inches.

A further aspect of the invention utilizes a core formed from specially produced softened polybutadiene elastomeric solid core having a conventional diameter of about 1.540 to 1.545 inches. The core is produced from a composition comprising a base elastomer selected from polybutadiene and mixtures of polybutadiene with other elastomers, at least one metallic salt of an unsaturated carboxylic acid (a co-crosslinking agent), and free radical initiator (a co-crosslinking agent). In addition, a suitable and compatible modifying ingredient including, but not limited to metal activators, fatty acids, fillers, polypropylene powder and other additives may be included.

Of particular concern, only a limited amount of the metallic salt of an unsaturated carboxylic acid is included in the core compositions in order to produce the degree of core softness and weight desired. In this regard, it is understood that when a larger overall ball is desired, the composition of the core is adjusted so that the molded finished ball falls within the weight parameters set forth by the U.S.G.A. Since the finished golf balls must still meet the U.S.G.A. weight limitation of 1.620 ounces, the core component of the larger and thicker covered balls are designed to be not only softer, but also lighter in weight.

In such circumstances, the specific gravity of the core is less than that of a standard core since the larger ball must weigh the same as a standard ball. The core generally weighs about 36 to 37 grams for an standard sized finished ball and about 33 to 34 grams for an oversized finished ball.

The core composition produces a softer molded core which still maintains the resilience (C.O.R.), compression (hardness) and durability characteristics required. The overall molded core has a PGA compression of about 45 to 85, preferably in the range of about 70–80. Its Riehle compression is about 0.075 or more, preferably in the range of 0.075 to 0.115, and the resilience of the core is about 0.760 to 0.780.

The cover in the low spin aspect of the invention is preferably comprised of a hard, high-stiffness ionomer resin, most preferably a metal cation neutralized high acid ionomer resin containing more than 16% carboxylic acid by weight, or blend thereof. The cover has a Shore D hardness of about 65 or greater.

Through the use of the softer cores and the hard cover, overall finished balls of the invention exhibit significantly lower spin rates than conventional balls of equal size and weight. Further, reduction in spin are also produced by increasing the thickness of the cover and by decreasing the weight of the softened core.

Further scope of the applicability of the present invention will become apparent from the detailed description given hereinafter. It should, however, be understood that the detailed description and specific examples, while indicating preferred embodiments of the invention, are given by way of illustration only, since various changes and modifications within the spirit and scope of the invention will become apparent to those skilled in the art.

DETAILED DESCRIPTION OF THE INVENTION

The present invention relates to improved cover compositions for golf ball construction. Specifically, according to the invention, golf balls having improved coefficient of restitution (C.O.R.) values are obtained using a cover material comprising specific blends of two or more high acid ionomers.

The present invention also relates to the development of a golf ball having a low spin rate as a result of combining a relatively soft core and a hard cover. Such a lower spin rate after club impact contributes to straighter shots when the ball is mis-hit, greater efficiency in flight, and a lesser degree of energy loss on impact with the ground, adding increased roll or distance. In addition, by increasing the diameter of the overall ball of the present invention beyond the U.S.G.A. minimum of 1.680 inches, the spin rate is still further decreased by up to around 500 r.p.m. or more upon being hit with a No. 9 iron travelling at a speed of 105 feet per second (fps). In this embodiment of the invention, the ball, even though of larger diameter, uses substantially the same size core as a standard golf ball, the difference in size is provided by the additional thickness in the cover of the ball. This larger, low spin ball produces even greater control and flight efficiency than the standard size ball embodiment of the present invention.

Notwithstanding the overall size differences of the various embodiments of the present invention, the core of the present invention is relatively soft and of similar size. It has a Riehle compression of about 0.075 or more, preferably about 0.075 to about 0.115, and a relatively low PGA compression of about 40 to 85, preferably about 70–80.

The specially produced core compositions and resulting molded cores of the present invention are manufactured using relatively conventional techniques. In this regard, the core compositions of the invention may be based on polybutadiene, and mixtures of polybutadiene with other elastomers. It is preferred that the base elastomer have a relatively high molecular weight. The broad range for the molecular weight of suitable base elastomers is from about 50,000 to about 500,000. A more preferred range for the molecular weight of the base elastomer is from about 100,000 to about 500,000. As a base elastomer for the core composition, cis-polybutadiene is preferably employed, or a blend of cis-polybutadiene with other elastomers may also be utilized. Most preferably, cis-polybutadiene having a weight-average molecular weight of from about 100,000 to about 500,000 is employed. Along this line, it has been found that the high cis-polybutadiene manufactured and sold by Shell Chemical Co., Houston, Tex., under the tradename Cariflex BR-1220, and the polyisoprene available from Muehlstein, H & Co., Greenwich, Conn. under the designation "SKI 35" are particularly well suited.

The unsaturated carboxylic acid component of the core composition (a co-crosslinking agent) is the reaction product of the selected carboxylic acid or acids and an oxide or carbonate of a metal such as zinc, magnesium, barium, calcium, lithium, sodium, potassium, cadmium, lead, tin, and the like. Preferably, the oxides of polyvalent metals such as zinc, magnesium and cadmium are used, and most preferably, the oxide is zinc oxide.

Exemplary of the unsaturated carboxylic acids which find utility in the present core compositions are acrylic acid, methacrylic acid, itaconic acid, crotonic acid, sorbic acid, and the like, and mixtures thereof. Preferably, the acid component is either acrylic or methacrylic acid. Usually, from about 15 to about 25, and preferably from about 17 to about 21 parts by weight of the carboxylic acid salt, such as zinc diacrylate, is included in the core composition. The unsaturated carboxylic acids and metal salts thereof are generally soluble in the elastomeric base, or are readily dispersible.

The free radical initiator included in the core composition is any known polymerization initiator (a co-crosslinking agent) which decomposes during the cure cycle. The term "free radical initiator" as used herein refers to a chemical which, when added to a mixture of the elastomeric blend and a metal salt of an unsaturated, carboxylic acid, promotes crosslinking of the elastomers by the metal salt of the unsaturated carboxylic acid. The amount of the selected initiator present is dictated only by the requirements of catalytic activity as a polymerization initiator. Suitable initiators include peroxides, persulfates, azo compounds and hydrazides. Peroxides which are readily commercially available are conveniently used in the present invention, generally in amounts of from about 0.1 to about 10.0 and preferably in amounts of from about 0.3 to about 3.0 parts by weight per each 100 parts of elastomer.

Exemplary of suitable peroxides for the purposes of the present invention are dicumyl peroxide, n-butyl 4,4'-bis (butylperoxy) valerate, 1,1-bis(t-butylperoxy)-3,3,5-trimethyl cyclohexane, di-t-butyl peroxide and 2,5-di-(t-butylperoxy)-2,5 dimethyl hexane and the like, as well as mixtures thereof. It will be understood that the total amount of initiators used will vary depending on the specific end product desired and the particular initiators employed.

Examples of such commercially available peroxides are Luperco 230 or 231 XL sold by Atochem, Lucidol Division, Buffalo, N.Y., and Trigonox 17/40 or 29/40 sold by Akzo Chemie America, Chicago, Ill. In this regard Luperco 230 XL and Trigonox 17/40 are comprised of n-butyl 4,4-bis (butylperoxy) valerate; and, Luperco 231 XL and Trigonox 29/40 are comprised of 1,1-bis(t-butylperoxy)-3,3,5-trimethyl cyclohexane. The one hour half life of Luperco 231 XL is about 112° C., and the one hour half life of Trigonox 29/40 is about 129° C.

The core compositions of the present invention may additionally contain any other suitable and compatible modifying ingredients including, but not limited to, metal oxides, fatty acids, and diisocyanates and polypropylene powder resin. For example, Papi 94, a polymeric diisocyanate, commonly available from Dow Chemical Co., Midland, Mich., is an optional component in the rubber compositions. It can range from about 0 to 5 parts by weight per 100 parts by weight rubber (phr) component, and acts as a moisture scavenger. In addition, it has been found that the addition of a polypropylene powder resin results in a core which is too hard (i.e. exhibits low compression) and thus allows for a reduction in the amount of crosslinking agent utilized to soften the core to a normal or below normal compression.

Furthermore, because polypropylene powder resin can be added to core composition without an increase in weight of the molded core upon curing, the addition of the polypropylene powder allows for the addition of higher specific gravity fillers, such as mineral fillers. Since the crosslinking agents utilized in the polybutadiene core compositions are expensive and/or the higher specific gravity fillers are relatively inexpensive, the addition of the polypropylene powder resin substantially lowers the cost of the golf ball cores while maintaining, or lowering, weight and compression.

The polypropylene ($C_3H_5$) powder suitable for use in the present invention has a specific gravity of about 0.90 g/cm$^3$, a melt flow rate of about 4 to about 12 and a particle size distribution of greater than 99% through a 20 mesh screen. Examples of such polypropylene powder resins include those sold by the Amoco Chemical Co., Chicago, Ill., under the designations "6400 P", "7000 P" and "7200 P". Generally, from 0 to about 25 parts by weight polypropylene powder per each 100 parts of elastomer are included in the present invention.

Various activators may also be included in the compositions of the present invention. For example, zinc oxide and/or magnesium oxide are activators for the polybutadiene. The activator can range from about 2 to about 30 parts by weight per 100 parts by weight of the rubbers (phr) component.

Moreover, filler-reinforcement agents may be added to the composition of the present invention. Since the specific gravity of polypropylene powder is very low, and when compounded, the polypropylene powder produces a lighter molded core, when polypropylene is incorporated in the core compositions, relatively large amounts of higher gravity fillers may be added so long as the specific core weight limitations are met. Additional benefits may be obtained by the incorporation of relatively large amounts of higher specific gravity, inexpensive mineral fillers such as calcium carbonate. Such fillers as are incorporated into the core compositions should be in finely divided form, as for example, in a size generally less than about 30 mesh and preferably less than about 100 mesh U.S. standard size. The amount of additional filler included in the core composition is primarily dictated by weight restrictions and preferably is included in amounts of from about 10 to about 100 parts by weight per 100 parts rubber.

The preferred fillers are relatively inexpensive and heavy and serve to lower the cost of the ball and to increase the weight of the ball to closely approach the U.S.G.A. weight limit of 1.620 ounces. However, if thicker cover compositions are to be applied to the core to produce larger than normal (i.e. greater than 1.680 inches in diameter) balls, use of such fillers and modifying agents will be limited in order to meet the U.S.G.A. maximum weight limitations of 1.620 ounces. Exemplary fillers include mineral fillers such as limestone, silica, micabarytes, calcium carbonate, or clays. Limestone is ground calcium/magnesium carbonate and is used because it is an inexpensive, heavy filler.

As indicated, ground flash filler may be incorporated and is preferably 20 mesh ground up center stock from the excess flash from compression molding. It lowers the cost and may increase the hardness of the ball.

Fatty acids or metallic salts of fatty acids may also be included in the compositions, functioning to improve moldability and processing. Generally, free fatty acids having from about 10 to about 40 carbon atoms, and preferably having from about 15 to about 20 carbon atoms, are used. Exemplary of suitable fatty acids are stearic acid and linoleic acids, as well as mixtures thereof. Exemplary of suitable metallic salts of fatty acids include zinc stearate. When included in the core compositions, the fatty acid component is present in amounts of from about 1 to about 25, preferably in amounts from about 2 to about 15 parts by weight based on 100 parts rubber (elastomer).

It is preferred that the core compositions include stearic acid as the fatty acid adjunct in an amount of from about 2 to about 5 parts by weight per 100 parts of rubber.

Diisocyanates may also be optionally included in the core compositions when utilized, the diioscyanates are included in amounts of from about 0.2 to about 5.0 parts by weight based on 100 parts rubber. Exemplary of suitable diisocyanates is 4,4'-diphenylmethane diisocyanate and other polyfunctional isocyanates know to the art.

Furthermore, the dialkyl tin difatty acids set forth in U.S. Pat. No. 4,844,471, the dispersing agents disclosed in U.S. Pat. No. 4,838,556, and the dithiocarbamates set forth in U.S. Pat. No. 4,852,884 may also be incorporated into the polybutadiene compositions of the present invention. The specific types and amounts of such additives are set forth in the above identified patents, which are incorporated herein by reference.

The core compositions of the invention are generally comprised of 100 parts by weight of a base elastomer (or rubber) selected from polybutadiene and mixtures of polybutadiene with other elastomers, 15 to 25 parts by weight of at least one metallic salt of an unsaturated carboxylic acid, and 1 to 10 parts by weight of a free radical initiator.

As indicated above, additional suitable and compatible modifying agents such as particulate polypropylene resin, fatty acids, and secondary additives such as Pecan shell flour, ground flash (i.e. grindings from previously manufactured cores of substantially identical construction), barium sulfate, zinc oxide, etc. may be added to the core compositions to adjust the weight of the ball as necessary in order to have the finished molded ball (core, cover and coatings) to closely approach the U.S.G.A. weight limit of 1.620 ounces.

In producing golf ball cores utilizing the present compositions, the ingredients may be intimately mixed using, for example, two roll mills or a Banbury mixer until the composition is uniform, usually over a period of from about 5 to about 20 minutes. The sequence of addition of components is not critical. A preferred blending sequence is as follows.

The elastomer, polypropylene powder resin (if desired), fillers, zinc salt, metal oxide, fatty acid, and the metallic dithiocarbamate (if desired), surfactant (if desired), and tin difatty acid (if desired), are blended for about 7 minutes in an internal mixer such as a Banbury mixer. As a result of shear during mixing, the temperature rises to about 200° F. The initiator and diisocyanate are then added and the mixing continued until the temperature reaches about 220° F. whereupon the batch is discharged onto a two roll mill, mixed for about one minute and sheeted out.

The sheet is rolled into a "pig" and then placed in a Barwell preformer and slugs are produced. The slugs are then subjected to compression molding at about 320° F. for about 14 minutes. After molding, the molded cores are cooled, the cooling effected at room temperature for about 4 hours or in cold water for about one hour. The molded cores are subjected to a centerless grinding operation whereby a thin layer of the molded core is removed to produce a round core having a diameter of 1.540 to 1.545 inches. Alternatively, the cores are used in the as-molded state with no grinding needed to achieve roundness.

The mixing is desirably conducted in such a manner that the composition does not reach incipient polymerization temperatures during the blending of the various components.

Usually the curable component of the composition will be cured by heating the composition at elevated temperatures on the order of from about 275° F. to about 350° F., preferably and usually from about 290° F. to about 325° F., with molding of the composition effected simultaneously with the curing thereof. The composition can be formed into a core structure by any one of a variety of molding techniques, e.g. injection, compression, or transfer molding. When the composition is cured by heating, the time required for heating will normally be short, generally from about 10 to about 20 minutes, depending upon the particular curing agent used. Those of ordinary skill in the art relating to free radical curing. agents for polymers are conversant with adjustments of cure times and temperatures required to effect optimum results with any specific free radical agent.

After molding, the core is removed from the mold and the surface thereof, preferably treated to facilitate adhesion thereof to the covering materials. Surface treatment can be effected by any of the several techniques known in the art, such as corona discharge, ozone treatment, sand blasting, and the like. Preferably, surface treatment is effected by grinding with an abrasive wheel.

The core is converted into a golf ball by providing at least one layer of covering material thereon, ranging in thickness from about 0.070 to about 0.130 inches and preferably from about 0.0675 to about 0.1275 inches.

The cover of the low spin embodiment typically has a Shore D hardness of 65 or greater. Its composition includes a hard, high stiffness preferably high acid ionomer such as that sold by E.I. DuPont de Nemours & Company under the trademark "Surlyn®" and by Exxon Corporation under the trademark "Escor®" or tradename "Iotek", or blends thereof. In addition to the Surlyn® and Escor® or Iotek ionomers, the cover may comprise any ionomer which either alone or in combination with other ionomers produces a molded cover having a Shore D hardness of at least 65. These include lithium ionomers or blends of ionomers with harder non-ionic polymers such as nylon, polyphenylene oxide and other compatible thermoplastics. As briefly mentioned above, examples of cover compositions which may be used are set forth in detail in copending U.S. Ser. No. 07/776,803 filed Oct. 15, 1991 now abandoned, and Ser. No. 07/901,660 filed Jun. 19, 1992 now abandoned, both incorporated herein by reference. Of course, the cover compositions are not limited in any way to those compositions set forth in said copending applications.

In this regard, the term "high acid ionomers" refers broadly to recently developed ionomer resins containing greater than 16 weight percent acid, preferably from about 17 to about 25 weight percent acid and more preferably from about 18.5 to about 21.5 weight percent methacrylic acid or acrylic acid. When utilized in golf ball cover construction, it has been found that the high acid ionomers, particularly blends of sodium and zinc high acid ionomers, as well as blends of sodium and magnesium high acid ionomers, extend the range of hardness beyond that previously obtainable while maintaining the beneficial properties (i.e. durability, click, feel, etc.) of the softer low acid ionomer covered balls, such as balls produced utilizing the low acid ionomers disclosed in U.S. Pat. Nos. 4,884,814 and 4,911,451. By using the high acid ionomer resins of the present invention, harder, stiffer golf balls having higher C.O.R.s, and thus longer distance, are obtained.

The high acid ionomers suitable for use in the present invention are ionic copolymers which are the metal, i.e. sodium, zinc, magnesium, etc., salts of the reaction product of an olefin having from 2 to 8 carbon atoms and an unsaturated monocarboxylic acid having from about 3 to 8 carbon atoms. Preferably, the ionomeric resins are copolymers of ethylene and either acrylic or methacrylic acid. In some circumstances, an additional comonomer such as an acrylate ester (i.e. iso- or n-butylacrylate, etc.) can also be included to produce a softer terpolymer. The carboxylic acid groups of the copolymer are partially neutralized (i.e. approximately 10–75%, preferably 30–70%) by the metal ions. Of critical importance, each of the high acid ionomer resins included in the cover compositions of the invention must contain greater than 16% by weight of a carboxylic acid, preferably from about 17% to about 25% by weight of a carboxylic acid, more preferably from about 18.5% to about 21.5% by weight of a carboxylic acid.

Although the scope of the invention embraces all known high acid ionomeric resins falling within the parameters set forth above, only a relatively limited number of these high acid ionomeric resins are currently available. In this regard, the high acid ionomeric resins available from E.I. DuPont de Nemours Company under the trademark "Surlyn®", and the high acid ionomer resins available from Exxon Corporation under either the trademark "Escor®" or the tradename "Iotek" are examples of available high acid ionomeric resins which may be utilized in the present invention in the particular combinations described in detail below.

The high acid ionomeric resins available from Exxon under the designation "Escor®" and/or "Iotek", are somewhat similar to the high acid ionomeric resins available under the "Surlyn®" trademark. However, since the Escor®/Iotek ionomeric resins are sodium or zinc salts of poly (ethylene acrylic acid) and the "Surlyn®" resins are zinc, sodium, magnesium, etc. salts of poly(ethylene methacrylic acid) distinct differences in properties exist.

Examples of the high acid methacrylic acid based ionomers found suitable for use in accordance with this invention include Surlyn® AD-8422 (sodium cation), Surlyn® 8162 (zinc cation), Surlyn® SEP-503-1 (zinc cation), and Surlyn® SEP-503-2 (magnesium cation). According to Dupont, all of these ionomers contain from about 18.5 to about 21.5% by weight methacrylic acid.

More particularly, Surlyn® AD-8422, is currently commercially available from DuPont in a number of different grades (i.e. AD-8422-2, AD-8422-3, AD-8422-5, etc.) based upon differences in melt index. According to DuPont, Surlyn® AD-8422 offers the following general properties when compared to Surlyn® 8920 the stiffest, hardest of all of the low acid grades (referred to as "hard" ionomers in U.S. Pat. No. 4,884,814):

| | LOW ACID (15 wt % Acid) | HIGH ACID (>20 wt % Acid) | |
|---|---|---|---|
| | SURLYN® 8920 | SURLYN® 8422-2 | SURLYN® 8422-3 |
| IONOMER | | | |
| Cation | Na | Na | Na |
| Melt Index | 1.2 | 2.8 | 1.0 |
| Sodium, Wt % | 2.3 | 1.9 | 2.4 |
| Base Resin MI | 60 | 60 | 60 |
| MP$^1$, ° C. | 88 | 86 | 85 |
| FP$^1$, ° C. | 47 | 48.5 | 45 |
| COMPRESSION MOLDING$^2$ | | | |
| Tensile Break, psi | 4350 | 4190 | 5330 |
| Yield, psi | 2880 | 3670 | 3590 |
| Elongation, % | 315 | 263 | 289 |
| Flex Mod, K psi | 53.2 | 76.4 | 88.3 |
| Shore D hardness | 66 | 67 | 68 |

$^1$DSC second heat, 10° C./min heating rate.
$^2$Samples compression molded at 150° C. annealed 24 hours at 60° C. 8422-2, -3 were homogenized at 190° C. before molding.

In comparing Surlyn® 8920 to Surlyn® 8422-2 and Surlyn® 8422-3, it is noted that the high acid Surlyn® 8422-2 and 8422-3 ionomers have a higher tensile yield, lower elongation, slightly higher Shore D hardness and much higher flexural modulus. Surlyn® 8920 contains 15 weight percent methacrylic acid and is 59% neutralized with sodium.

In addition, Surlyn® SEP-503-1 (zinc cation) and Surlyn® SEP-503-2 (magnesium cation) are high acid zinc and magnesium versions of the Surlyn® AD 8422 high acid ionomers. When compared to the Surlyn® AD 8422 high acid ionomers, the Surlyn® SEP-503-1 and SEP-503-2 ionomers can be defined as follows:

| Surlyn® Ionomer | Ion | Melt Index | Neutralization % |
|---|---|---|---|
| AD 8422-3 | Na | 1.0 | 45 |
| SEP 503-1 | Zn | 0.8 | 38 |
| SEP 503-2 | Mg | 1.8 | 43 |

Furthermore, Surlyn® 8162 is a zinc cation ionomer resin containing approximately 20% by weight (i.e. 18.5–21.5% weight) methacrylic acid copolymer that has been 30–70% neutralized. Surlyn 8162 is currently commercially available from DuPont.

Some additional Surlyn® ionomers (ethylene/methacrylic acid based) available from DuPont which are useful in the cover blends of the present inventions include, but are not limited to, Surlyn® 8940(Na), Surlyn® 9910(Zn), Surlyn® 8140(Na), Surlyn® 9120(Zn), Surlyn® 8552/6120(Mg), Surlyn® 8220(Na), Surlyn® 9220(Zn), Surlyn® 9320(Zn), and Surlyn® SEP-741. Additionally, a non-ionic ethylene methacrylic ionomer such as Nucrel 925 (a non-ionic, ethylene/methacrylic acid ionomer available from DuPont) can also be utilized in the blends of the present invention.

Additionally, as a result of the development by the inventors of a number of new high acid ionomers neutralized to various extents by several different types of metal cations, such as by manganese, lithium, potassium, calcium and nickel cations, several new high acid ionomers and/or high acid ionomer blends besides sodium, zinc and magnesium high acid ionomers or ionomer blends are now available for golf ball cover production. It has been found that these new cation neutralized high acid ionomer blends produce cover compositions exhibiting enhanced hardness and resilience due to synergies which occur during processing. Consequently, the metal cation neutralized high acid ionomer resins recently produced can be blended to produce substantially harder covered golf balls having higher C.O.R.'s than those produced by the low acid ionomer covers presently commercially available.

More particularly, several new metal cation neutralized high acid ionomer resins have been produced by the inventors by neutralizing, to various extents, high acid copolymers of an alpha-olefin and an alpha, beta-unsaturated carboxylic acid with a wide variety of different metal cation salts. This discovery is the subject matter of U.S. application Ser. No. 901,680, incorporated herein by reference. It has been found that numerous new metal cation neutralized high acid ionomer resins can be obtained by reacting a high acid copolymer (i.e. a copolymer containing greater than 16% by ethylene/methacrylic acid copolymer, an ethylene/itaconic acid copolymer, an ethylene/maleic acid copolymer, an ethylene/methacrylic acid/vinyl acetate copolymer, an ethylene/acrylic acid/vinyl alcohol copolymer, etc. The base copolymer broadly contains greater than 16% by weight unsaturated carboxylic acid, from about 30 to about 83% by weight ethylene and from 0 to about 40% by weight of a softening comonomer. Preferably, the copolymer contains about 20% by weight unsaturated carboxylic acid and about 80% by weight ethylene. Most preferably, the copolymer contains about 20% acrylic acid with the remainder being ethylene.

Along these lines, examples of the preferred high acid base copolymers which fulfill the criteria set forth above, are a series of ethylene-acrylic copolymers which are commercially available from The Dow Chemical Company, Midland, Mich., under the "Primacor" designation. These high acid base copolymers exhibit the typical properties set forth below in Table 1.

TABLE 1

Typical Properties of Primacor Ethylene-Acrylic Acid Copolymers

| GRADE ASTM | PERCENT ACID | DENSITY, g/cc D-792 | MELT INDEX, g/10 min D-1238 | TENSILE YD. ST (psi) D-638 | FLEXURAL MODULUS (psi) D-790 | VICAT SOFT PT (° C.) D-1525 | SHORE D HARDNESS D-2240 |
|---|---|---|---|---|---|---|---|
| 5980 | 20.0 | 0.958 | 300.0 | — | 4800 | 43 | 50 |
| 5990 | 20.0 | 0.955 | 1300.0 | 650 | 2600 | 40 | 42 |
| 5990 | 20.0 | 0.955 | 1300.0 | 650 | 3200 | 40 | 42 |
| 5981 | 20.0 | 0.960 | 300.0 | 900 | 3200 | 46 | 48 |
| 5981 | 20.0 | 0.960 | 300.0 | 900 | 3200 | 46 | 48 |
| 5983 | 20.0 | 0.958 | 500.0 | 850 | 3100 | 44 | 45 |
| 5991 | 20.0 | 0.953 | 2600.0 | 635 | 2600 | 38 | 40 |

[1]The Melt Index values are obtained according to ASTM D-1238, at 190° C.

weight acid, preferably from about 17 to about 25 weight percent acid, and more preferably about 20 weight percent acid), with a metal cation salt capable of ionizing or neutralizing the copolymer to the extent desired (i.e. from about 10% to 90%).

The base copolymer is made up of greater than 16% by weight of an alpha, beta-unsaturated carboxylic acid and an alpha-olefin. Optionally, a softening comonomer can be included in the copolymer. Generally, the alpha-olefin has from 2 to 10 carbon atoms and is preferably ethylene, and the unsaturated carboxylic acid is a carboxylic acid having from about 3 to 8 carbons. Examples of such acids include acrylic acid, methacrylic acid, ethacrylic acid, chloroacrylic acid, crotonic acid, maleic acid, fumaric acid, and itaconic acid, with acrylic acid being preferred.

The softening comonomer that can be optionally included in the invention may be selected from the group consisting of vinyl esters of aliphatic carboxylic acids wherein the acids have 2 to 10 carbon atoms, vinyl ethers wherein the alkyl groups contains 1 to 10 carbon atoms, and alkyl acrylates or methacrylates wherein the alkyl group contains 1 to 10 carbon atoms. Suitable softening comonomers include vinyl acetate, methyl acrylate, methyl methacrylate, ethyl acrylate, ethyl methacrylate, butyl acrylate, butyl methacrylate, or the like.

Consequently, examples of a number of copolymers suitable for use to produce the high acid ionomers included in the present invention include, but are not limited to, high acid embodiments of an ethylene/acrylic acid copolymer, an Due to the high molecular weight of the Primacor 5981 grade of the ethylene-acrylic acid copolymer, this copolymer is the more preferred grade utilized in the invention.

The metal cation salts utilized in the invention are those salts which provide the metal cations capable of neutralizing, to various extents, the carboxylic acid groups of the high acid copolymer. These include acetate, oxide or hydroxide salts of lithium, calcium, zinc, sodium, potassium, nickel, magnesium, and manganese.

Examples of such lithium ion sources are lithium hydroxide monohydrate, lithium hydroxide, lithium oxide and lithium acetate. Sources for the calcium ion include calcium hydroxide, calcium acetate and calcium oxide. Suitable zinc ion sources are zinc acetate dihydrate and zinc acetate, a blend of zinc oxide and acetic acid. Examples of sodium ion sources are sodium hydroxide and sodium acetate. Sources for the potassium ion include potassium hydroxide and potassium acetate. Suitable nickel ion sources are nickel acetate, nickel oxide and nickel hydroxide. Sources of magnesium include magnesium oxide, magnesium hydroxide, magnesium acetate. Sources of manganese include manganese acetate and manganese oxide.

The new metal cation neutralized high acid ionomer resins are produced by reacting the high acid base copolymer with various amounts of the metal cation salts above the crystalline melting point of the copolymer, such as at a temperature from about 200° F. to about 500° F., preferably from about 250° F. to about 350° F. under high shear conditions at a pressure of from about 10 psi to 10,000 psi.

Other well known blending techniques may also be used. The amount of metal cation salt utilized to produce the new metal cation neutralized high acid based ionomer resins is the quantity which provides a sufficient amount of the metal cations to neutralize the desired percentage of the carboxylic acid groups in the high acid copolymer. The extent of neutralization is generally from about 10% to about 90%.

As indicated below in Table 2, more specifically in Example 1 in U.S. application Ser. No. 901,680 now abandoned, a number of new types of metal cation neutralized high acid ionomers can be obtained from the above indicated process. These include new high acid ionomer resins neutralized to various extents with manganese, lithium, potassium, calcium and nickel cations. In addition, when a high acid ethylene/acrylic acid copolymer is utilized as the base copolymer component of the invention and this component is subsequently neutralized to various extents with the metal cation salts producing acrylic acid based high acid ionomer resins neutralized with cations such as sodium, potassium, lithium, zinc, magnesium, manganese, calcium and nickel, several new cation neutralized acrylic acid based high acid ionomer resins are produced.

TABLE 2

| Formulation No. | Wt % Cation Salt | Wt % Neutralization | Melt Index | C.O.R. | Shore D Hardness |
|---|---|---|---|---|---|
| 1 (NaOH) | 6.98 | 67.5 | 0.9 | .804 | 71 |
| 2 (NaOH) | 5.66 | 54.0 | 2.4 | .808 | 73 |
| 3 (NaOH) | 3.84 | 35.9 | 12.2 | .812 | 69 |
| 4 (NaOH) | 2.91 | 27.0 | 17.5 | .812 | (brittle) |
| 5 (MnAc) | 19.6 | 71.7 | 7.5 | .809 | 73 |
| 6 (MnAc) | 23.1 | 88.3 | 3.5 | .814 | 77 |
| 7 (MnAc) | 15.3 | 53.0 | 7.5 | .810 | 72 |
| 8 (MnAc) | 26.5 | 106 | 0.7 | .813 | (brittle) |
| 9 (LiOH) | 4.54 | 71.3 | 0.6 | .810 | 74 |
| 10 (LiOH) | 3.38 | 52.5 | 4.2 | .818 | 72 |
| 11 (LiOH) | 2.34 | 35.9 | 18.6 | .815 | 72 |
| 12 (KOH) | 5.30 | 36.0 | 19.3 | Broke | 70 |
| 13 (KOH) | 8.26 | 57.9 | 7.18 | .804 | 70 |
| 14 (KOH) | 10.7 | 77.0 | 4.3 | .801 | 67 |
| 15 (ZnAc) | 17.9 | 71.5 | 0.2 | .806 | 71 |
| 16 (ZnAc) | 13.9 | 53.0 | 0.9 | .797 | 69 |
| 17 (ZnAc) | 9.91 | 36.1 | 3.4 | .793 | 67 |
| 18 (MgAc) | 17.4 | 70.7 | 2.8 | .814 | 74 |
| 19 (MgAc) | 20.6 | 87.1 | 1.5 | .815 | 76 |
| 20 (MgAc) | 13.8 | 53.8 | 4.1 | .814 | 74 |
| 21 (CaAc) | 13.2 | 69.2 | 1.1 | .813 | 74 |
| 22 (CaAc) | 7.12 | 34.9 | 10.1 | .808 | 70 |
| 23 (MgC) | 2.91 | 53.5 | 2.5 | .813 | |
| 24 (MgO) | 3.85 | 71.5 | 2.8 | .808 | |
| 25 (MgO) | 4.76 | 89.3 | 1.1 | .809 | |
| 26 (MgO) | 1.96 | 35.7 | 7.5 | .815 | |
| 27 (NiAc) | 13.04 | 61.1 | 0.2 | .802 | 71 |
| 28 (NiAc) | 10.71 | 48.9 | 0.5 | .799 | 72 |
| 29 (NiAc) | 8.26 | 36.7 | 1.8 | .796 | 69 |
| 30 (NiAc) | 5.66 | 24.4 | 7.5 | .786 | 64 |

Controls:
50/50 Blend of Ioteks 8000/7030 C.O.R. = .810/65 Shore D Hardness
DuPont High Acid Surlyn ® 8422 (Na) C.O.R. = .811/70 Shore D Hardness
DuPont High Acid Surlyn ® 8162 (Zn) C.O.R. = .807/65 Shore D Hardness
Exxon High Acid Iotek EX-960 (Zn) C.O.R. = .796/65 Shore D Hardness
Control for Formulations 23–26 is 50/50 Iotek 8000/7030, C.O.R. = .814, Formulation 26 C.O.R. was normalized to that control accordingly
Control for Formulation Nos. 27–30 is 50/50 Iotek 8000/7030, C.O.R. = .807

When compared to low acid versions of similar cation neutralized ionomer resins, the new metal cation neutralized high acid ionomer resins exhibit enhanced hardness, modulus and resilience characteristics. These are properties that are particularly desirable in a number of thermoplastic fields, including the field golf ball manufacturing.

When utilized in golf ball cover construction, it has been found that the new acrylic acid based high acid ionomers extend the range of hardness beyond that previously obtainable while maintaining the beneficial properties (i.e. durability, click, feel, etc.) of the softer low acid ionomer covered balls, such as balls produced utilizing the low acid ionomers disclosed in U.S. Pat. Nos. 4,884,814 and 4,911,451, and the recently produced high acid blends disclosed in U.S. application Ser. No. 776,803. Moreover, as a result of the development of a number of new acrylic acid based high acid ionomer resins neutralized to various extents by several different types of metal cations, such as manganese, lithium, potassium, calcium and nickel cations, several new ionomers or ionomer blends are now available for golf ball production. By using these high acid ionomer resins harder, stiffer golf balls having higher C.O.R.s, and thus longer distance, can be obtained.

As will be further noted in the Examples below, other ionomer resins may be used in the cover compositions, such as low acid ionomer resins, so long as the molded cover produces a Shore D hardness of 65 or more.

Additioally, further examples of the high acid acrylic acid based ionomers suitable for use in the present invention include the Escor® or Iotek high acid ethylene acrylic acid ionomers recently produced by Exxon. In this regard, Escor® or Iotek 959 is a sodium ion neutralized ethylene-acrylic acid copolymer and Escor® or Iotek 960 is a zinc neutralized ethylene-acrylic acid copolymer. According to Exxon, Ioteks 959 and 960 contain from about 19.0 to about 21.0% by weight acrylic acid with approximately 30 to about 70 percent of the acid groups neutralized with sodium and zinc ions respectfully. The physical properties of these high acid acrylic acid based ionomers are as follows:

| PROPERTY | ESCOR ® (IOTEK) 959 | ESCOR ® (IOTEK) 960 |
|---|---|---|
| Melt Index, g/10 min | 2.0 | 1.8 |
| Cation | Sodium | Zinc |
| Melting Point, ° F. | 172 | 174 |
| Vicat Softening Point, ° F. | 130 | 131 |
| Tensile @ Break, psi | 4600 | 3500 |
| Elongation @ Break, % | 325 | 430 |
| Hardness, Shore D | 66 | 57 |
| Flexural Modulus, psi | 66,000 | 27,000 |

For comparison purposes, examples of commercially available low acid acrylic acid based ionomer resins, such as these utilized in U.S. Pat. No. 4,911,451 are set forth below.

Typical Properties of Low Acid Escor ® (Iotek) Ionomers

| | ASTM Method | Units | 4000 | 4010 | 8000 | 8020 | 8030 | 7010 | 7020 | 7030 |
|---|---|---|---|---|---|---|---|---|---|---|
| Resin Properties | | | | | | | | | | |
| Cation type | | | zinc | zinc | sodium | sodium | sodium | zinc | zinc | zinc |
| Melt index | D-1238 | g/10 min. | 2.5 | 1.5 | 0.8 | 1.6 | 2.8 | 0.8 | 1.5 | 2.5 |
| Density | D-1505 | kg/m$^3$ | 963 | 963 | 954 | 960 | 960 | 960 | 960 | 960 |
| Melting Point | D-3417 | ° C. | 90 | 90 | 90 | 87.5 | 87.5 | 90 | 90 | 90 |
| Crystallization Point | D-3417 | ° C. | 62 | 64 | 56 | 53 | 55 | — | — | — |
| Vicat Softening Point | D-1525 | ° C. | 62 | 63 | 61 | 64 | 67 | 60 | 63 | 62.5 |
| % Weight Acrylic Acid | | | 16 | — | 11 | — | — | — | — | — |
| % of Acid Groups Cation Neutralized | | | 30 | — | 40 | — | — | — | — | — |
| Plaque properties (3 mm thick, compression molded) | | | | | | | | | | |
| Tensile at Break | D-638 | MPa | 24 | 26 | 36 | 31.5 | 28 | 38 | 38 | 38 |
| Yield point | D-638 | MPa | none | none | 21 | 21 | 23 | none | none | none |
| Elongation at break | D-638 | % | 395 | 420 | 350 | 410 | 395 | 500 | 420 | 395 |
| 1% Secant modulus | D-638 | MPa | 160 | 160 | 300 | 350 | 390 | — | — | — |
| Shore Hardness D | D-2240 | — | 55 | 55 | 61 | 58 | 59 | 57 | 55 | 55 |

According to the present invention, it has been found that when two or more of the above-indicated high acid ionomers, particularly blends of sodium and zinc high acid ionomers, or blends of sodium and magnesium high acid ionomers, or blends of zinc and magnesium high acid ionomers are processed according to the parameters set forth below to produce the covers of multi-layered golf balls, the resulting golf balls will travel further than previously known low acid ionomer resin covers and/or covers produced from high acid ionomers and/or high acid/low acid ionomer blends due to the balls' enhanced coefficient of restitution values. This is particularly important in that an improvement of 0.001 in C.O.R. generally relates to our improvement of about 0.2 to 0.5 yards in travel distance. In addition, the resulting golf balls maintain the playability and durability characteristics exhibited by known low-acid ionomer resin covered balls.

When blends of sodium and zinc high acid ionomers are used, the ratio of sodium high acid ionomer to zinc high acid ionomer can be from about 90% to about 10% and from about 10% to about 90%. A more preferred range is from about 75% to about 25% and from about 25% to about 75%.

Similarly, when blends of sodium and magnesium high acid ionomers are utilized, the ratio of sodium high acid ionomer to magnesium high acid ionomer can be from about 90% to about 10% and from about 10% to about 90%. A more preferred range is from about 75% to about 25% and from about 25% to about 75%.

Additional compatible additive materials may also be added to the compositions of the present invention, such as dyes (for example, Ultramarine Blue sold by Whitaker, Clark, and Daniels of South Painsfield, N.J.), and pigments, i.e. white pigments such as titanium dioxide (for example Unitane 0-110) zinc oxide, and zinc sulfate, as well as fluorescent pigments. As indicated in U.S. Pat. No. 4,884,814, the amount of pigment and/or dye used in conjunction with the polymeric cover composition depends on the particular base ionomer mixture utilized and the particular pigment and/or dye utilized. The concentration of the pigment in the polymeric cover composition can be from about 1% to about 10% as based on the weight of the base ionomer mixture. A more preferred range is from about 1% to about 5% as based on the weight of the base ionomer mixture. The most preferred range is from about 1% to about 3% as based on the weight of the base ionomer mixture. The most preferred pigment for use in accordance with this invention is titanium dioxide.

Moreover, since these are various hues of white, i.e. blue white, yellow white, etc., trace amounts of blue pigment may be added to the cover stock composition to impart a blue white appearance thereto. However, if different hues of the color white are desired, different pigments can be added to the cover composition at the amounts necessary to produce the color desired.

In addition, it is within the purview of this invention to add to the cover compositions of this invention compatible materials which do not affect the basic novel characteristics of the composition of this invention. Among such materials are antioxidants (i.e. Santonox R), antistatic agents, stabilizers and processing aids. The cover compositions of the present invention may also contain softening agents, such as plasticizers, etc., and reinforcing materials such as glass fibers and inorganic fillers, as long as the desired properties produced by the golf ball covers of the invention are not impaired.

Furthermore, optical brighteners, such as those disclosed in U.S. Pat. No. 4,679,795, may also be included in the cover composition of the invention. Examples of suitable optical brighteners which can be used in accordance with this invention are Uvitex OB as sold by the Ciba-Geigy Chemical Company, Ardaley, N.Y. Uvitex OB is thought to be 2,5-Bis(5-tert-butyl-2-benzoxazoly)thiopene. Examples of other optical brighteners suitable for use in accordance with this invention are as follows: Leucopure EGM as sold by Sandoz, East Hanover, N.J. 07936. Leucopure EGM is thought to be 7-(2h-naphthol (1,2-d)-triazol-2yl)-3phenyl-coumarin. Phorwhite K-20G2 is sold by Mobay Chemical Corporation, P.O. Box 385, Union Metro Park, Union, N.J.

07083, and is thought to be a pyrazoline derivative, Eastobrite OB-1 as sold by Eastman Chemical Products, Inc. Kingsport, Tenn., is thought to be 4,4-Bis(-benzoxaczoly) stilbene. The above-mentioned Uvitex and Eastobrite OB-1 are preferred optical brighteners for use in accordance with this invention.

Moreover, since many optical brighteners are colored, the percentage of optical brighteners utilized must not be excessive in order to prevent the optical brightener from functioning as a pigment or dye in its own right.

The percentage of optical brighteners which can be used in accordance with this invention is from about 0.01% to about 0.5% as based on the weight of the polymer used as a cover stock. A more preferred range is from about 0.05% to about 0.25% with the most preferred range from about 0.10% to about 0.020% depending on the optical properties of the particular optical brightener used and the polymeric environment in which it is a part.

Generally, the additives are admixed with a ionomer to be used in the cover composition to provide a masterbatch (M.B.) of desired concentration and an amount of the masterbatch sufficient to provide the desired amounts of additive is then admixed with the copolymer blends.

The cover compositions of the present invention may be produced according to conventional melt blending procedures. In this regard, two or more of the above indicated high acid ionomeric resins are blended along with the masterbatch containing the desired additives in a Banbury type mixer, two-roll mill, or extruded prior to molding. The blended composition is then formed into slabs or pellets, etc. and maintained in such a state until molding is desired. Alternatively a simple dry blend of the pelletized or granulated resins and color masterbatch may be prepared and fed directly into the injection molding machine where homogenization occurs in the mixing section of the barrel prior to injection into the mold. If necessary, further additives such as an inorganic filler, etc., may be added and uniformly mixed before initiation of the molding process.

Moreover, golf balls of the present invention can be produced by molding processes currently well known in the golf ball art. Specifically, the golf balls can be produced by injection molding or compression molding the novel cover compositions about wound or solid molded cores to produce a golf ball having a diameter of about 1.680 inches or greater and weighing about 1.620 ounces. The standards for both the diameter and weight of the balls are established by the United States Golf Association (U.S.G.A.). Although both solid core and wound cores can be utilized in the present invention, as a result of their lower cost and superior performance, solid molded cores are preferred over wound cores.

Conventional solid cores are typically compression molded from a slug of uncured or lightly cured elastomer composition comprising a high cis content polybutadiene and a metal salt of an $\alpha$, $\beta$, ethylenically unsaturated carboxylic acid such as zinc mono or diacrylate or methacrylate. To achieve higher coefficients of restitution in the core, the manufacturer may include a small amount of a metal oxide such as zinc oxide. In addition, larger amounts of metal oxide than those that are needed to achieve the desired coefficient may be included in order to increase the core weight so that the finished ball more closely approaches the U.S.G.A. upper weight limit of 1.620 ounces. Other materials may be used in the core composition including compatible rubbers or ionomers, and low molecular weight fatty acids such as stearic acid. Free radical initiator catalysts such as peroxides are admixed with the core composition so that on the application of heat and pressure, a complex curing or cross-linking reaction takes place.

The term "solid cores" as used herein refers not only to one piece cores but also to those cores having a separate solid layer beneath the cover and above the core as in U.S. Pat. No. 4,431,193, and other multilayer and/or non-wound cores (such as those described in U.S. Pat. No. 4,848,770).

Wound cores are generally produced by winding a very large elastic thread around a solid or liquid filled balloon center. The elastic thread is wound around the center to produce a finished core of about 1.4 to 1.6 inches in diameter, generally. Since the core material is not an integral part of the present invention, a detailed discussion concerning the specific types of core materials which may be utilized with the cover compositions of the invention are not specifically set forth herein. In this regard, the cover compositions of the invention may be used in conjunction with any standard golf ball core.

As indicated, the golf balls of the present invention may be produced by forming covers consisting of the compositions of the invention around cores by conventional molding processes. For example, in compression molding, the cover composition is formed via injection at about 380° F. to about 450° F. into smooth surfaced hemispherical shells which are then positioned around the core in a dimpled golf ball mold and subjected to compression molding at 200–300° F. for 2–10 minutes, followed by cooling at 50–70° F. for 2–10 minutes, to fuse the shells together to form an unitary ball. In addition, the golf balls may be produced by injection molding, wherein the cover composition is injected directly around the core placed in the center of a golf ball mold for a period of time at a mold temperature of from 50° F. to about 100° F. After molding the golf balls produced may undergo various further finishing steps such as buffing, painting, and marking as disclosed in U.S. Pat. No. 4,911,451.

The present invention is further illustrated by the following examples in which the parts of the specific ingredients are by weight (pbw). It is to be understood that the present invention is not limited to the examples, and various changes and modifications may be made in the invention without departing from the spirit and scope thereof.

EXAMPLE 1

By blending the ingredients set forth in the Tables below, a series of cover formulations were produced. Finished golf balls were prepared using the cover compositions of the present invention, controls and comparative cover compositions by positioning a solid preformed cross-linked polybutadiene core in an injection molding cavity in such a manner to permit the uniform injection of the selected cover composition over each core. Along this line, the cover formulations were injection molded at about 400° F. around identical solid type cores having a finished diameter of 1.545 inches to produce golf balls approximately 1.680 inches in diameter having a normal cover thickness of 0.0675 inches. All materials were molded under essentially identical conditions. The properties of Riehle compression, coefficient of restitution (C.O.R.), shore hardness, cold crack, cut resistance, and wet barrel for the cover compositions were then determined.

In conducting the comparative prior art testing, Surlyn® 9910, Surlyn® 8940, Escor® 4000 and Escor® 900/8000 ionomers were utilized. In this regard, blends of Surlyn® 9910 and Surlyn® 8940 (i.e. the subject of U.S. Pat. No.

4,884,814) and blends of Escor® 4000 and Escor® 900/8000 (i.e. the subject of U.S. Pat. No. 4,911,451) are considered by the inventors to be generally among the best prior art cover compositions concerning ethylene-methacrylic acid and ethylene-acrylic acid ionomer blends, respectively.

In the examples set forth below Surlyn® White MB (master batch) is, unless indicated differently, comprised of 74.9% Surlyn® 8528, 23.7% Unitane 0-110, 0.24% Ultra Blue, 1.05% Uvitex O.B. and 0.03% Santonox R; and, Escor® (Iotek) White MB (masterbatch) is comprised of 74.9% Iotek 4000, 23.7% Unitane 0-110, 0.24% Ultra Blue, 1.05% Uvitex O.B., and 03.% Santonox R.

The data for each example represents the average data for one dozen balls produced according to the desired manner. The properties were measured according to the following parameters wherein the definitions are used in the specification and claims.

PGA Compression

PGA compression is an important property involved in the performance of a golf ball. The compression of the ball can affect the playability of the ball on striking and the sound or "click" produced. Similarly, compression can effect the "feel" of the ball (i.e., hard or soft responsive feel), particularly in chipping and putting.

Moreover, while compression itself has little bearing on the distance performance of a ball, compression can affect the playability of the ball on striking. The degree of compression of a ball against the club face and the softness of the cover strongly influences the resultant spin rate. Typically, a softer cover will produce a higher spin rate than a harder cover. Additionally, a harder core will produce a higher spin rate than a softer core. This is because at impact a hard core serves to compress the cover of the ball against the face of the club to a much greater degree than a soft core thereby resulting in more "grab" of the ball on the clubface and subsequent higher spin rates. In effect the cover is squeezed between the relatively incompressible core and clubhead. When a softer core is used, the cover is under much less compressive stress than when a harder core is used and therefore does not contact the clubface as intimately. This results in lower spin rates.

The term "compression" utilized in the golf ball trade generally defines the overall deflection that a golf ball undergoes when subjected to a compressive load. For example, PGA compression indicates the amount of change in golf ball's shape upon striking. The development of solid core technology in two-piece balls has allowed for much more precise control of compression in comparison to thread wound three-piece balls. This is because in the manufacture of solid core balls, the amount of deflection or deformation is precisely controlled by the chemical formula used in making the cores. This differs from wound three-piece balls wherein compression is controlled in part by the winding process of the elastic thread. Thus, two-piece and multi-layer solid core balls exhibit much more consistent compression readings than balls having wound cores such as the thread wound three-piece balls.

In the past, PGA compression related to a scale of from 0 to 200 given to a golf ball. The lower the PGA compression value, the softer the feel of the ball upon striking. In practice, tournament quality balls have compression ratings around 70–110, preferably around 80 to 100.

In determining PGA compression using the 0–200 scale, a standard force is applied to the external surface of the ball. A ball which exhibits no deflection (0.0 inches in deflection) is rated 200 and a ball which deflects ²⁄₁₀th of an inch (0.2 inches) is rated 0. Every change of 0.001 of an inch in deflection represents a 1 point drop in compression. Consequently, a ball which deflects 0.1 inches (100×0.001 inches) has a PGA compression value of 100 (i.e., 200–100) and a ball which deflects 0.110 inches (110×0.001 inches) has a PGA compression of 90 (i.e., 200–110).

In order to assist in the determination of compression, several devices have been employed by the industry. For example, PGA compression is determined by an apparatus fashioned in the form of a small press with an upper and lower anvil. The upper anvil is at rest against a 200-pound die spring, and the lower anvil is movable through 0.300 inches by means of a crank mechanism. In its open position the gap between the anvils is 1.780 inches allowing a clearance of 0.100 inches for insertion of the ball. As the lower anvil is raised by the crank, it compresses the ball against the upper anvil, such compression occurring during the last 0.200 inches of stroke of the lower anvil, the ball then loading the upper anvil which in turn loads the spring. The equilibrium point of the upper anvil is measured by a dial micrometer if the anvil is deflected by the ball more than 0.100 inches (less deflection is simply regarded as zero compression) and the reading on the micrometer dial is referred to as the compression of the ball. In practice, tournament quality balls have compression ratings around 80 to 100 which means that the upper anvil was deflected a total of 0.120 to 0.100 inches.

An example to determine PGA compression can be shown by utilizing a golf ball compression tester produced by Atti Engineering Corporation of Newark, N.J. The value obtained by this tester relates to an arbitrary value expressed by a number which may range from 0 to 100, although a value of 200 can be measured as indicated by two revolutions of the dial indicator on the apparatus. The value obtained defines the deflection that a golf ball undergoes when subjected to compressive loading. The Atti test apparatus consists of a lower movable platform and an upper movable spring-loaded anvil. The dial indicator is mounted such that it measures the upward movement of the spring-loaded anvil. The golf ball to be tested is placed in the lower platform, which is then raised a fixed distance. The upper portion of the golf ball comes in contact with and exerts a pressure on the springloaded anvil. Depending upon the distance of the golf ball to be compressed, the upper anvil is forced upward against the spring.

Riehle Compression

Alternative devices have also been employed to determine compression. For example, Applicant also utilizes a modified Riehle Compression Machine originally produced by Riehle Bros. Testing Machine Company, Phil., Pa. to evaluate compression of the various components (i.e., cores, mantle cover balls, finished balls, etc.) of the golf balls. The Riehle compression device determines deformation in thousandths of an inch under a load designed to emulate the 200 pound spring constant of the Atti or PGA compression device. Using such a device, a Riehle compression of 61 corresponds to a deflection under load of 0.061 inches.

Additionally, an approximate relationship between Riehle compression and PGA compression exists for balls of the same size. It has been determined by Applicant that Riehle compression corresponds to PGA compression by the general formula PGA compression=160−Riehle compression. Consequently, 80 Riehle compression corresponds to 80

PGA compression, 70 Riehle compression corresponds to 90 PGA compression, and 60 Riehle compression corresponds to 100 PGA compression. For reporting purposes, Applicant's compression values are usually measured as Riehle compression and converted to PGA compression.

Furthermore, additional compression devices may also be utilized to monitor golf ball compression so long as the correlation to PGA compression is know. These devices have been designed, such as a Whitney Tester, to correlate or correspond to PGA compression through a set relationship or formula.

Coefficient of Restitution

The resilience or coefficient of restitution (COR) of a golf ball is the constant "e," which is the ratio of the relative velocity of an elastic sphere after direct impact to that before impact. As a result, the COR ("e") can vary from 0 to 1, with 1 being equivalent to a perfectly or completely elastic collision and 0 being equivalent to a perfectly or completely inelastic collision.

COR, along with additional factors such as club head speed, club head mass, ball weight, ball size and density, spin rate, angle of trajectory and surface configuration (i.e., dimple pattern and area of dimple coverage) as well as environmental conditions (e.g. temperature, moisture, atmospheric pressure, wind, etc.) generally determine the distance a ball will travel when hit. Along this line, the distance a golf ball will travel under controlled environmental conditions is a function of the speed and mass of the club and size, density and resilience (COR) of the ball and other factors. The initial velocity of the club, the mass of the club and the angle of the ball's departure are essentially provided by the golfer upon striking. Since club head, club head mass, the angle of trajectory and environmental conditions are not determinants controllable by golf ball producers and the ball size and weight are set by the U.S.G.A., these are not factors of concern among golf ball manufacturers. The factors or determinants of interest with respect to improved distance are generally the coefficient of restitution (COR) and the surface configuration (dimple pattern, ratio of land area to dimple area, etc.) of the ball.

The COR in solid core balls is a function of the composition of the molded core and of the cover. The molded core and/or cover may be comprised of one or more layers such as in multi-layered balls. In balls containing a wound core (i.e., balls comprising a liquid or solid center, elastic windings, and a cover), the coefficient of restitution is a function of not only the composition of the center and cover, but also the composition and tension of the elastomeric windings. As in the solid core balls, the center and cover of a wound core ball may also consist of one or more layers.

The coefficient of restitution is the ratio of the outgoing velocity to the incoming velocity. In the examples of this application, the coefficient of restitution of a golf ball was measured by propelling a ball horizontally at a speed of 125+/−5 feet per second (fps) and corrected to 125 fps against a generally vertical, hard, flat steel plate and measuring the ball's incoming and outgoing velocity electronically. Speeds were measured with a pair of Oehler Mark 55 ballistic screens available from Oehler Research, Inc., P.O. Box 9135, Austin, Tex. 78766, which provide a timing pulse when an object passes through them. The screens were separated by 36" and are located 25.25" and 61.25" from the rebound wall. The ball speed was measured by timing the pulses from screen 1 to screen 2 on the way into the rebound wall (as the average speed of the ball over 36"), and then the exit speed was timed from screen 2 to screen 1 over the same distance. The rebound wall was tilted 2 degrees from a vertical plane to allow the ball to rebound slightly downward in order to miss the edge of the cannon that fired it. The rebound wall is solid steel 2.0 inches thick.

As indicated above, the incoming speed should be 125±5 fps but corrected to 125 fps. The correlation between COR and forward or incoming speed has been studied and a correction has been made over the ±5 fps range so that the COR is reported as if the ball had an incoming speed of exactly 125.0 fps.

The coefficient of restitution must be carefully controlled in all commercial golf balls if the ball is to be within the specifications regulated by the United States Golf Association (U.S.G.A.). As mentioned to some degree above, the U.S.G.A. standards indicate that a "regulation" ball cannot have an initial velocity exceeding 255 feet per second in an atmosphere of 75° F. when tested on a U.S.G.A. machine. Since the coefficient of restitution of a ball is related to the ball's initial velocity, it is highly desirable to produce a ball having sufficiently high coefficient of restitution to closely approach the U.S.G.A. limit on initial velocity, while having an ample degree of softness (i.e., hardness) to produce enhanced playability (i.e., spin, etc.).

Shore D Hardness

As used herein, "Shore D hardness" of a cover layer is measured generally in accordance with ASTM D-2240, except the measurements are made on the curved surface of a molded cover layer, rather than on a plaque. Furthermore, the Shore D hardness of the cover layer is measured while the cover layer remains over the core and any underlying cover layers. When a hardness measurement is made on a dimpled cover, Shore D hardness is measured, to the best extent possible, at a land area of the dimpled cover.

Cut resistance was measured in accordance with the following procedure: A golf ball is fired at 135 feet per second against the leading edge of a pitching wedge, wherein the leading edge radius is 1/32 inch, the loft angle is 51 degrees, the sole radius is 2.5 inches, and the bounce angle is 7 degrees.

The cut resistance of the balls tested herein was evaluated on a scale of 1–5. 5 represents a cut that extends completely through the cover to the core; a 4 represents a cut that does not extend completely through the cover but that does break the surface; a 3 does not break the surface of the cover but does leave a permanent dent; a 2 leaves only a slight crease which is permanent but not as severe as 3; and a 1 represents virtually no visible indentation or damage of any sort.

Cold cracking resistance was measured by firing balls from an air cannon, 5 blows at 165 feet/sec, after the balls had been conditioned for 24 hours at −10° F. After allowing the balls to equilibrate to room temperature the balls are inspected for cover cracking.

Wet barrel is a coating adhesion test performed as follows: Finished clear coated balls are cured a total of 16 hours at 125° F. ±50 in production clear coat oven. Balls are water soaked at least 3 hours prior to barrel testing for 100 blows at 135 feet/sec. After barrel testing, balls are dyed, inspected and reported.

TABLE 3

| Ingredients | Formulations | | | | | | | | | | |
|---|---|---|---|---|---|---|---|---|---|---|---|
| | 1 | 2 | 3 | 4 | 5 | 6 | 7 | 8 | 9 | 10 | 11 |
| SURLYN 9910 (Zn) | 438 | — | — | — | — | — | — | 219 | 219 | — | — |
| SURLYN 8940 (Na) | 1370 | — | — | — | — | — | — | 685 | 685 | — | — |
| SURLYN 8422-2 (Na) | — | — | 1807 | — | — | 904 | — | 904 | — | 904 | — |
| SURLYN 8422-3 (Na) | — | — | — | 1807 | — | — | 904 | — | — | — | — |
| SURLYN 7940 (Li)[1] | — | — | — | — | 1807 | 904 | 904 | — | 904 | — | 904 |
| ESCOR 4000 (Zn) | — | 904 | — | — | — | — | — | — | — | 452 | 452 |
| ESCOR 900 (Na) | — | 904 | — | — | — | — | — | — | — | 452 | 452 |
| SURLYN WHITE MB | 193 | — | 193 | 193 | 193 | 193 | 193 | 193 | 193 | — | — |
| ESCOR WHITE MB | — | 193 | — | — | — | — | — | — | — | 193 | 193 |
| PROPERTIES | | | | | | | | | | | |
| WEIGHT | 45.2 | 45.3 | 45.2 | 45.2 | 44.9 | 45.1 | 45.1 | 45.2 | 44.9 | 45.2 | 45.0 |
| COMPRESSION | 47 | 45 | 46 | 44 | 50 | 46 | 47 | 47 | 49 | 45 | 49 |
| C.O.R | .817 | .822 | .816 | .817 | .816 | .817 | .818 | .819 | .816 | .818 | .817 |
| COLD CRACK | NB | NB | 3BK | 3BK | NB | 5BK | 2BK | 3BK | NB | 4BK | 1BK |

[1]Surlyn ® 7940 is a 61,000 psi flex-modulus, lithium neutralized poly(ethylene-methacrylic acid) ionomer

TABLE 4

| Ingredients | Formulations | | | | | | |
|---|---|---|---|---|---|---|---|
| | 12 | 13 | 14 | 15 | 16 | 17 | 18 |
| SURLYN 9910 (Zn) | 438 | — | 438 | — | — | 438 | — |
| SURLYN 8940 (Na) | 1370 | — | — | — | 1370 | — | 1370 |
| SURLYN 8422-3 (Na) | — | — | 1370 | 904 | — | — | — |
| SURLYN 7940 (Li)[1] | — | — | — | — | 438 | 1370 | — |
| ESCOR 4000 (Zn) | — | 904 | — | — | — | — | — |
| ESCOR 900 (Na) | — | 904 | — | 904 | — | — | — |
| ESCOR WHITE MB | — | 193 | — | 193 | — | — | — |
| SURLYN WHITE MB | 193 | — | 193 | — | 193 | 193 | 193 |
| LUCALEN MX-4300[2] | — | — | — | — | — | — | 438 |
| LUCALEN HX-4300[3] | — | — | — | — | — | — | — |
| PROPERTIES | | | | | | | |
| WEIGHT | 45.6 | 45.7 | 45.9 | 45.9 | 45.6 | 45.8 | 45.8 |
| COMPRESSION | 54 | 51 | 50 | 50 | 53 | 53 | 52 |
| C.O.R. | .814 | .819 | .815 | .814 | .811 | .812 | .812 |
| WET BARREL TEST | — | — | — | — | — | — | 1BK |
| COLD CRACK | — | — | — | — | — | — | 7BK |

| | Formulations | | | | | | |
|---|---|---|---|---|---|---|---|
| | 19 | 20 | 21 | 22 | 23 | 24 | 25 |
| Ingredients | | | | | | | |
| SURLYN 9910 (Zn) | — | — | — | — | — | — | — |
| SURLYN 8940 (Na) | 1370 | 904 | — | — | — | — | — |
| SURLYN 8422-3 (Na) | — | — | — | 904 | 904 | — | — |
| SURLYN 7940 (Li)[1] | — | — | — | — | 904 | 452 | 1356 |
| ESCOR 4000 (Zn) | — | — | — | — | — | 678 | 226 |
| ESCOR 900 (Na) | — | — | 904 | — | — | 678 | 226 |
| ESCOR WHITE MB | — | — | 193 | 193 | 193 | 193 | 193 |
| SURLYN WHITE MB | 193 | 193 | — | — | — | — | — |
| LUCALEN MX-4300[2] | — | 904 | 904 | 904 | — | — | — |
| LUCALEN HX-4300[3] | 438 | — | — | — | — | — | — |
| PROPERTIES | | | | | | | |
| WEIGHT | 45.9 | 45.6 | 45.6 | 45.6 | 45.0 | 45.7 | 45.1 |
| COMPRESSION | 52 | 53 | 52 | 51 | 50 | 50 | 50 |
| C.O.R. | .813 | .810 | .806 | .809 | .815 | .816 | .813 |

TABLE 4-continued

| | | | | | | | |
|---|---|---|---|---|---|---|---|
| WET BARREL TEST | — | — | — | — | — | — | — |
| COLD CRACK | — | — | — | — | — | — | — |

[1] Surlyn® 7940 is a 61,000 psi flex-modulus, lithium neutralized poly(ethylene-methacrylic acid) ionomer.
[2] Lucalen MX-4300 is a 30,000 psi flex-modulus, zinc neutralized poly(ethylene-acrylic acid) ionomer.
[3] Lucalen HX-4300 is a 20,000 psi flex-modulus, zinc neutralized poly(ethylene-acrylic acid) ionomer.

TABLE 5

| | Formulations | | | | |
|---|---|---|---|---|---|
| | 26 | 27 | 28 | 29 | 30 |
| Ingredients | | | | | |
| SURLYN 9910 (Zn) | 438 | — | — | — | — |
| SURLYN 8940 (Na) | 8940 | — | — | — | — |
| SURLYN 8422-3 (Na) | — | — | 1808 | — | 904 |
| SURLYN 7940 (Li) | — | — | — | 1808 | 904 |
| ESCOR 4000 (Zn) | — | 904 | — | — | — |
| ESCOR 900 (Na) | — | 904 | — | — | — |
| SURLYN WHITE MB | 192 | — | 192 | 192 | 192 |
| ESCOR WHITE MB | — | 192 | — | — | — |
| PROPERTIES | | | | | |
| WEIGHT | 45.1 | 45.3 | 45.4 | 45.1 | 45.1 |
| C.O.R. | .805 | .812 | .812 | .805 | .809 |
| COMPRESSION | 48 | 48 | 44 | 49 | 47 |
| DENSITY | 67 | 69 | 72 | 68 | 70 |
| STEIFFEL | 10/2 | 11/2 | 3/1 | 9/2 | 7/2 |
| CUT TEST | 2/3 | 1/3 | 9/2 | 3/3 | 4/3 |

TABLE 6

| | Formulations | | | | | | | |
|---|---|---|---|---|---|---|---|---|
| | 31 | 32 | 33 | 34 | 35 | 36 | 37 | 38 |
| Ingredients | | | | | | | | |
| SURLYN AD 8422-3 (Na) | — | — | 45.4 | 45.4 | — | — | 45.4 | — |
| SURLYN SEP 503-1 (Zn) | — | — | 45.4 | — | 45.4 | — | — | 45.4 |
| SURLYN SEP 503-2 (Mg) | — | — | — | 45.4 | 45.4 | — | — | — |
| SURLYN 7940 (Li) | — | — | — | — | — | 45.4 | — | — |
| SURLYN 9910 (Zn) | 22.2 | — | — | — | — | — | — | — |
| SURLYN 8940 (Na) | 68.5 | — | — | — | — | — | — | — |
| ESCOR 4000 (Zn) | — | 45.4 | — | — | — | — | — | — |
| ESCOR 900 (Na) | — | 45.4 | — | — | — | — | — | — |
| TG WHITE SURLYN | 9.3 | — | 9.3 | 9.3 | 9.3 | 9.3 | 9.3 | — |
| TG WHITE ESCOR | — | 9.3 | — | — | — | — | — | — |
| HI-MILAN AM 7311 (Mg)[1] | — | — | — | — | — | 45.4 | — | — |
| SURLYN 8269 (Na) | — | — | — | — | — | — | — | 45.4 |
| SURLYN 8270 (Zn) | — | — | — | — | — | — | 45.4 | — |
| PROPERTIES | | | | | | | | |
| WEIGHT | 44.7 | 45.1 | 45.0 | 44.9 | 45.0 | 44.9 | 45.1 | 45.0 |
| COMPRESSION | 47 | 46 | 46 | 46 | 48 | 49 | 53 | 55 |
| C.O.R. | .815 | .818 | .821 | .818 | .816 | .811 | .805 | .800 |
| WET BARREL TEST | NB | NB | 1BK | 2BK | NB | — | — | — |

[1] HI-Milan AM 7311 (Mg) is a 53,000 psi flex-modulus, magnesium neutralized poly(ethylene-methacrylic acid) ionomer.

TABLE 7

| | Formulations | | | | | | | | | | | |
|---|---|---|---|---|---|---|---|---|---|---|---|---|
| | 39 | 40 | 41 | 42 | 43 | 44 | 45 | 46 | 47 | 48 | 49 | 50 |
| Ingredients | | | | | | | | | | | | |
| SURLYN AD-8422 (Na) | — | — | 1814 | — | — | 908 | 908 | — | 908 | — | — | 908 |
| SURLYN SEP-503-1 (Zn) | — | — | — | 1814 | — | 908 | — | 908 | — | 908 | 908 | — |

TABLE 7-continued

| | Formulations | | | | | | | | | | | |
|---|---|---|---|---|---|---|---|---|---|---|---|---|
| | 39 | 40 | 41 | 42 | 43 | 44 | 45 | 46 | 47 | 48 | 49 | 50 |
| SURLYN SEP-503-2 (Mg) | — | — | — | — | 1814 | — | 908 | 908 | — | — | — | — |
| SURLYN 9910 (Zn) | 908 | — | — | — | — | — | — | — | 908 | — | — | — |
| SURLYN 8940 (Na) | 908 | — | — | — | — | — | — | — | — | 908 | — | — |
| ESCOR 4000 (Zn) | — | 908 | — | — | — | — | — | — | — | — | — | — |
| ESCOR 900 (Na) | — | 908 | — | — | — | — | — | — | — | — | — | — |
| TG WHITE SURLYN MB | 186 | — | 186 | 186 | 186 | 186 | 186 | 186 | 186 | 186 | 186 | 186 |
| TG WHITE ESCOR MB | — | 186 | — | — | — | — | — | — | — | — | — | — |
| SURLYN 7940 (Li) | — | — | — | — | — | — | — | — | — | — | 908 | 908 |
| PROPERTIES | | | | | | | | | | | | |
| C.O.R. | .814 | .818 | .818 | .814 | .812 | .820 | .816 | .813 | .815 | .815 | .815 | .813 |
| COMPRESSION | 49 | 47 | 47 | 48 | 50 | 4 | 7 | 49 | 49 | 48 | 47 | 49 |
| HARDNESS SHORE D | 66 | 67 | 70 | 67 | 69 | 69 | — | — | — | — | — | — |

TABLE 8

| | Formulations | | | | |
|---|---|---|---|---|---|
| Ingredients | 51 | 52 | 53 | 54 | 55 |
| SURLYN AD-8422 (Na) | — | — | 908 | 908 | — |
| SURLYN SEP-503-1 (Zn) | — | — | 908 | — | 908 |
| SURLYN SEP-503-2 (Mg) | — | — | — | 908 | 908 |
| SURLYN 9910 (Zn) | 908 | — | — | — | — |
| SURLYN 8940 (Na) | 908 | — | — | — | — |
| ESCOR 4000 (Zn) | — | 908 | — | — | — |
| ESCOR 900/8000 (Na) | — | 908 | — | — | — |
| TG WHITE MB (SURLYN) | 186 | — | 186 | 186 | 186 |
| TG WHITE MB (ESCOR) | — | 186 | — | — | — |
| PROPERTIES | | | | | |
| WEIGHT | 45.1 | 45.1 | 45.3 | 45.2 | 45.1 |
| COMPRESSION | 52 | 50 | 49 | 49 | 49 |
| C.O.R. | .816 | .819 | .823 | .822 | .819 |
| COLD CRACK | NB | NB | 1 BK | NB | 2 BK |

| | Formulations | | | | |
|---|---|---|---|---|---|
| Ingredients | 56 | 57 | 58 | 59 | 60 |
| SURLYN AD-8422 (Na) | 1362 | 454 | 1362 | 454 | 454 |
| SURLYN SEP-503-1 (Zn) | 454 | 1362 | — | 454 | 454 |
| SURLYN SEP-503-2 (Mg) | — | — | 454 | — | — |
| SURLYN 9910 (Zn) | — | — | — | 454 | — |
| SURLYN 8940 (Na) | — | — | — | 454 | — |
| ESCOR 4000 (Zn) | — | — | — | — | 454 |
| ESCOR 900/8000 (Na) | — | — | — | — | 454 |
| TG WHITE MB (SURLYN) | 186 | 186 | 186 | 186 | 93 |
| TG WHITE MB (ESCOR) | — | — | — | — | 93 |
| PROPERTIES | | | | | |
| WEIGHT | 45.1 | 45.2 | 45.1 | 45.1 | 45.1 |
| COMPRESSION | 48 | 50 | 51 | 51 | 51 |
| C.O.R. | .822 | .822 | .820 | .821 | .822 |
| COLD CRACK | NB | 5 BK | 3 BK | NB | 1 BK |

TABLE 9

| | Formulations | | | |
|---|---|---|---|---|
| Ingredients | 61 | 62 | 63 | 64 |
| SURLYN AD-8422-5 (Na) | 100 | — | 50 | 75 |
| SURLYN AD-8162 (Zn) | — | 100 | 50 | 25 |
| TG WHITE SURLYN MB[1] | 10 | 10 | 10 | 10 |
| ESCOR 4000 (Zn) | — | — | — | — |
| ESCOR 900/8000 (Na) | — | — | — | — |
| ESCOR WHITE MB | — | — | — | — |

TABLE 9-continued

| PROPERTIES | | | | |
|---|---|---|---|---|
| WEIGHT | 45.2 | 45.1 | 45.2 | 45.3 |
| C.O.R. | .816 | .813 | .819 | .818 |
| COMPRESSION | 50 | 53 | 50 | 49 |

| | Formulations | | | |
|---|---|---|---|---|
| Ingredients | 65 | 66 | 67 | 68 |
| SURLYN AD-8422-5 (Na) | 25 | — | — | — |
| SURLYN AD-8162 (Zn) | 75 | — | — | — |
| TE WHITE SURLYN MB | 10 | — | — | — |
| ESCOR 4000 (Zn) | — | 50 | 100 | — |
| ESCOR 900/8000 (Na) | — | 50 | — | 100 |
| ESCOR WHITE MB | — | 10 | 10 | 10 |
| PROPERTIES | | | | |
| WEIGHT | 45.3 | 45.2 | 45.0 | 45.1 |
| C.O.R. | .820 | .817 | .799 | .813 |
| COMPRESSION | 50 | 50 | 56 | 52 |

[1]T.G. White Surlyn MB (masterbatch) is comprised of 75.85% Surlyn ® 8528, 23.77% Unitane 0–110, 0.05% Ultra Blue, 0.22% Uvitex O.B. and 0.03% Santonox R.

TABLE 10

| | Formulations | | |
|---|---|---|---|
| Ingredients | 69 | 70 | 71 |
| ESCOR (Iotek) 8000 (Na) | 45.2 | — | — |
| ESCOR (Iotek) 7030 (Zn) | 45.2 | — | — |
| ESCOR (Iotek) 959 (Na) | — | — | 45.2 |
| ESCOR (Iotek) 960 (Zn) | — | — | 45.2 |
| MB-ESCOR | 9.6 | — | 9.6 |
| SURLYN 8422-5 (Na) | — | 22.6 | — |
| SURLYN 8162 (Zn) | — | 67.8 | — |
| MB-SURLYN | — | 9.6 | — |
| PROPERTIES | | | |
| WEIGHT | — | — | — |
| C.O.R. | .800 | .802 | .806 |
| COMPRESSION | — | — | — |
| COLD CRACK | — | — | — |

DISCUSSION OF THE EXAMPLES

The data set forth in Tables 3–10 directed to covers composed of a single high acid grade ionomer (i.e. sodium-high acid Surlyn® 8422-2, sodium-high acid Surlyn® 8422-3, zinc-high acid Surlyn® 8162, sodium-high acid Escor® 959, zinc-high acid Escor® 960, etc.) blended with a single low acid grade ionomer (i.e. zinc-low acid Surlyn® 9910, sodium-low acid Surlyn® 8940, lithium-low acid Surlyn® 7940, zinc-low acid Escor® 4000/7030, sodium-low acid Escor® 900/8000, etc.) indicates that such high acid/low acid ionomer blends do not result in cover compositions exhibiting higher coefficient of restitution values while maintaining the desired durability and playability (i.e. compression, hardness, etc.) characteristics over those obtained using what is generally regarded by the inventors as being the best prior art (i.e. blends of Escor® 4000/7030 and Escor® 900/8000, the subject matter of U.S. Pat. No. 4,911,451, which are set forth for comparison purposes in Examples (i.e. "Formulations") 2, 13, 27, 32, 40, 52, 66 and 69)

In addition, the data set forth in the Tables 3–10 supports the findings disclosed in U.S. Pat. No. 4,911,451 that covers comprised singularly or blends of ethylene-acrylic acid ionomers such as zinc neutralized ethylene-acrylic acid copolymer and/or sodium neutralized ethylene-acrylic acid copolymer, i.e. the Escor® 4000/7030 and 900/8000 ionomers respectively, exhibit markedly elevated coefficients of restitution (C.O.R.) values in comparison to comparable Surlyn® salts of poly (ethylene-methacrylic copolymers) i.e. (Surlyn® 9910 and Surlyn® 8940 in the Examples) while maintaining the durability and playability properties desired.

Moreover, the data further indicates that it is not until the cover compositions are composed of blends of at least two or more high acid grade ionomers that cover compositions exhibiting improved coefficient of restitution values are obtained over the prior art while maintaining the durability and playability characteristics desired. This can be seen for instance in Examples 33, 34, 44, 53–58, 63–65 and 71. In this regard, it has been found that when blends of two or more high acid ionomers, such as blends containing sodium-high acid ionomers (i.e. Surlyn® AD 8422, Escor® 959, etc.) and magnesium-high acid ionomers (i.e. Surlyn® SEP-503-2), and more preferably, blends containing sodium-high acid ionomers (i.e. Surlyn® AD 8422, Escor® 959, etc.) and zinc-high acid ionomers (i.e. Surlyn® 8162, Surlyn® SEP-503-1, Escor® 960, etc.), are utilized to produce the cover material of the golf ball, harder, stiffer golf balls having higher C.O.R. values are obtained. This is demonstrated with respect to the sodium-high acid/zinc-high acid blends in Examples 33, 44, 53, 56–57, 63–65 and 71, the preferred cover composition of the invention, and with respect to the sodium-high acid/magnesium blends in Examples 34, 54 and 58. Further, the data set forth in Example 55 indicates that blends of magnesium-high acid/zinc-high acid may be effective. However, as a result of the difficulties noted in durability, this blend is not as preferred as the sodium-high acid/zinc-high acid and the sodium high acid/magnesium-high acid blends noted above.

The most preferred methacrylic acid based high acid ionomer formulation to date is that exhibited in Example 56 (i.e. a blend of about 75 weight % sodium-high acid ionomer and about 25 weight % zinc-high acid ionomers) since it consistently produces the highest C.O.R. values along with the necessary cold cracking resistance. However, as indicated in the Examples (see for instance Examples 63–65), the effective range of the invention varies greatly. The only apparent limiting variable is that the cover composition must be composed of blends of at least two or more high acid grade compositions exhibiting the characteristics set forth above.

Further, although limited data has been collected as a result of the only recent availability of acrylic acid based high acid ionomers, Example 71 represents the most preferred acrylic acid based high acid ionomer blend to date. As exhibited briefly in Table 10, the acrylic acid based high acid ionomer blends may produce significant improvements over those currently exhibited by cover compositions comprised of blends of high acid methacrylic acid based ionomer resins.

Moreover, the data also indicates that cover compositions comprised of only a single high acid ionomer are generally ineffective. This is consistent with previous findings concerning ionomers utilized in golf ball cover applications. As indicated U.S. Pat. Nos. 3,819,768 and 4,911,451, a synergistic enhancement in coefficient of restitution may be obtained by blending different cation neutralized ionomers, such as by blending zinc and sodium ionomers (as well as contributing good low temperature durability) and this relationship apparently also holds for the high-acid ionomer blends of the present invention as well.

In addition, as indicated in examples 59 and 60, the cover compositions containing two or more high acid ionomers may also be blended with effective amounts of low acid ionomer resins to produce covers exhibiting enhanced C.O.R. values while maintaining adequate durability and playability properties. As a result, the new "high acid" ionomeric resin blends extend the range of hardness beyond that previously obtainable, while maintaining all of the beneficial properties (i.e. durability, etc.) of the softer low acid ionomer covered balls.

Consequently, as it can be readily appreciated from review of the data set forth above, the novel high-acid ionomer blends of the cover compositions of the invention produce not only the durability and playability characteristics associated with prior art low acid ionomer blends, but also enhanced coefficient of restitution, and thus, enhanced carrying or travel distance, desired.

The low spin golf ball embodiment of the present invention is further illustrated by the following examples in which the parts of the specific ingredients are by weight (pbw). It is to be understood that the present invention is not limited to the examples, and various changes and modifications may be made in the invention without departing from the spirit and scope thereof.

EXAMPLE 2

Using the ingredients tabled below, golf ball cores having a finished diameter of about 1.540 to about 1.545 inches were produced by compression molding and subsequent removal of a surface layer by grinding. Each core was formulated using 100 parts elastomer (rubber). In the formulations, the amounts of remaining ingredients are expressed in parts by weight, and the weight, degrees of coefficient of restitution and compression (both Riehle and PGA) achieved are set forth below. The data for these examples are the averages for twelve cores which were produced for each example. The properties of the molded cores produced from each formulation were measured according to the parameters as set forth previously.

The following core formulations were prepared according to the methods set forth above:

| CORE COMPOSITIONS | | | | |
|---|---|---|---|---|
| | A | B | C | D |
| Ingredients | | | | |
| BR-1220[1] | 100 | 100 | 100 | 100 |
| Zinc Diacrylate | 18 | 20 | 37 | 26 |
| Ground Flash | 17 | 20 | 20 | 17 |
| Zinc Oxide | 6 | 6 | 6 | 6 |
| Limestone | 7 | 25 | 15 | — |
| Zinc Stearate | 15 | 20 | 20 | 15 |
| 6400 Polypropylene[2] | 10 | — | — | 10 |
| Trigonox 17/40[3] | 1.5 | 1.5 | 1.5 | 1.5 |
| Papi 94[4] | 0.5 | 0.5 | 0.5 | 0.5 |
| Molded Core Properties | | | | |
| Core Diameter (in.) | 1.541 | 1.542 | 1.543 | 1.542 |
| Weight (grams) | 33.7 | 36.5 | 36.8 | 33.8 |
| Compression (Riehle/PGA) | 87/73 | 83/77 | 64/96 | 74/86 |
| C.O.R. (ē) | .773 | .782 | .802 | .787 |

[1]BR-1220 is a polybutadiene manufactured and sold by Shell Chemical Co., Houston, Texas.
[2]6400 P. is a powdered polypropylene available from Amco Chemical Co., Chicago, Illinois.
[3]Trig 17/40 is a peroxide manufactured and sold by Akzo Chemie, Chicago, Illinois (one hour half life is at 129° C.).
[4]Papi 94 is a polymeric diisocynanate available from Dow Chemical Co., Midland, Michigan.

As noted by the above indicated data, core formulations A and B produce softer cores. Formulation A is appropriate for a molded ball having an overall diameter of about 1.720 inches (i.e., 1.717"). It has less filler, hence a lower specific gravity, than formulation B which is appropriate for a smaller ball, one having a diameter of about 1.680 inches. Formulations C and D are for conventional harder cores. Formulation C is slightly heavier and used for a ball having a diameter of about 1.680 inches. Formulation D is used for producing a ball having a diameter of about 1.720 inches (1.717").

EXAMPLE 3

Cover compositions were produced by blending the following constituents:

| COVER COMPOSITIONS | | | |
|---|---|---|---|
| Ingredients | Cover 1 | Cover 2 | Cover 3 |
| Iotek 8000 | 45.2 | — | 22.6 |
| Iotek 7030 | 45.2 | — | 22.6 |
| Iotek 959 | — | 45.2 | — |
| Iotek 960 | — | 45.2 | — |
| Iotek 7520[1] | — | — | 45.2 |
| White MB[2] | 9.6 | 9.6 | 9.6 |

[1]Iotek 7520 is a relatively soft, low acid, ionomer resin produced by Exxon.
[2]MB = 74.9 wt-% Iotek 7030, 23.8 wt-% $TiO_2$, 0.01 wt-% Unitex OB, 0.002 wt-% ultra marine blue and 300 ppm Santonox R.

Of the three cover formulations provided above, formulation 2 is the hardest. It is comprised of two hard, high acid ionomer resins. Iotek 959 has an acid content of about 19% to 21% and Iotek 960 also has an acid content of about 19 to 21%.

Formulation 3 provides the softest of the three cover formulations and is substantially similar to the formulation used in the TOP-FLITE TOUR EDITION 90 golf ball. Formulation 3 is comprised of Iotek 8000 and Iotek 7030, both hard, low acid ionomers, and Iotek 7520, a soft, low-acid ionomer, in the amounts set forth above.

Formulation 1 provides intermediate hardness, and is essentially the same formulation used in the TOP FLITE XL II ball (see U.S. Pat. No. 4,911,481).

EXAMPLE 4

The cover formulations set forth in Example 3 were injection molded at about 400° F. around cores of formulations A–D in Example 2 in a manner to permit uniform injection of the selected cover composition over each core. Each of the cores had an identical finished diameter of about 1.541–1.543 inches to produce golf balls of approximately 1.720 (1.717) inches (cores A and D) or about 1.680 inches (cores B and C) in diameter. The cover thickness varied between about 0.069 and about 0.088 inches. All materials were molded under essentially identical conditions. The properties of Riehle compression, PGA compression, coefficient of restitution (C.O.R.), barrel durability (100 blows), cover hardness and spin rate were determined. The results are set forth in Table 11 below.

The data for each example represents the average data for one dozen balls produced according to the desired manner. The properties. were measured according to the following parameters:

The barrel test or barrel durability test involves firing golf balls at 135 ft./sec. (at 72° F.), into a 5-sided container, the walls of which are steel plates that have grooves milled into them to simulate a golf club face. The balls are subjected to 100 to 300 blows and are inspected at regular intervals for breakage (i.e. any signs of cover cracking or delamination). NB=no breakage.

The spin rate of the golf ball was measured by striking the resulting golf balls with a 9-iron wherein the club-head speed is about 105 feet per second and the ball is launched at an angle of 26 to 34 degrees with an initial velocity of about 110–115 feet per second. The spin rate was measured by observing the rotation of the ball in flight using stop action Strobe photography.

TABLE 11

| Ball/Type (Core/Cover) | Ball Size | Riehle Comp. | PGA Comp. | C.O.R. | Barrel Durability (100 blows) | Cover Hardness Shore C/D | Spin Rate #9 Iron (105 fps) |
|---|---|---|---|---|---|---|---|
| A, 1 | 1.72 | 62 | 98 | .814 | NB | 96/65 | 7019 |
| A, 2 | 1.72 | 59 | 101 | .827 | NB | 97/68 | 6544 |

TABLE 11-continued

| Ball/Type (Core/Cover) | Ball Size | Riehle Comp. | PGA Comp. | C.O.R. | Barrel Durability (100 blows) | Cover Hardness Shore C/D | Spin Rate #9 Iron (105 fps) |
|---|---|---|---|---|---|---|---|
| A, 3 | 1.72 | 65 | 95 | .795 | NB | 87/56 | 8409 |
| B, 1 | 1.68 | 61 | 99 | .793 | NB | 95/65 | 7541 |
| B, 2 | 1.68 | 57 | 103 | .803 | NB | 97/68 | 6755 |
| B, 3 | 1.68 | 62 | 98 | .775 | NB | 87/56 | 8764 |
| C, 1 | 1.68 | 49 | 111 | .816 | NB | 95/65 | 7643 |
| C, 2 | 1.68 | 47 | 113 | .822 | NB | 97/68 | 6933 |
| C, 3 | 1.68 | 50 | 110 | .805 | NB | 87/56 | 9231 |
| D, 1 | 1.72 | 57 | 105 | .820 | NB | 95/65 | 7285 |
| D, 2 | 1.72 | 55 | 105 | .830 | NB | 97/68 | 6816 |
| D, 3 | 1.72 | 58 | 102 | .802 | NB | 87/56 | 8578 |

For comparison purposes, the same results are provided for known preexisting golf balls:

| Ball/Type (Core/Cover) | Ball Size | Riehle Comp. | PGA Comp. | C.O.R. | Barrel Durability (100 blows) | Cover Hardness Shore C/D | Spin Rate #9 Iron (105 fps) |
|---|---|---|---|---|---|---|---|
| Titleist Tour 100 | 1.68 | 73 | 87 | .792 | NB | 83/51 | 9676 |
| Tour Edition 100 | 1.68 | 58 | 102 | .802 | NB | 85/53 | 9961 |
| Tour Edition 90 | 1.68 | 56 | 104 | .802 | NB | 87/56 | 9621 |
| Top-Flite XL II | 1.68 | 51 | 109 | .810 | NB | 95/65 | 7163 |

Molded ball spin test results show that notwithstanding differences in ball size, the combination of a soft core (cores A and B) with a hard cover (cover formulations 1 and 2) minimizes spin rate. Even in the instance where harder cores are used (cores C and D) the golf ball with the hardest cover formulation tested (formulation 2) provides for golf balls having the lowest spin rate.

Further reduction in spin rate is observed through the use of a soft core (core A and B) with the hardest cover (cover formulation 2), with the largest reduction in spin rate observed through the use of the softest core (core A) with the hardest cover (cover formulation 2).

It should be further noted that increased diameter provides for lower spin rates. In comparing balls A,1–3 with corresponding balls B,1–3, the balls having the larger diameter (A,1–3) are lower in spin than balls B,1–3, respectively. The C.O.R. and compression are controlled mainly by the core formulation, with a hard fast core giving a harder, faster ball. As ball diameter increases upon increasing the cover thickness (core diameter remains the same), the thicker cover (0.0888 versus 0.0690 inches) provides for significant C.O.R. pick-up from center to ball. Further, the increased cover thickness plays a role in added spin reduction observed for the larger balls.

With attention still focused on the tabulated results, the combination of a soft core with a hard cover gives the lowest spin. In comparing ball A,2 to ball D,2 (both at 1.72 inches in diameter) it is seen that the softer core A contributes to lower spin rates. Combination A,2 (softer core, hardest cover) provides the lowest spin rate for the entire test. These same trends hold for the smaller balls, i.e. ball B,2 is lower in spin that ball C,2. While ball B,2 is the lowest spin among the 1.68 inch balls, its spin rate is not as low as ball A,2 which has a larger diameter. This is believed to be attributed to the differences in cover thickness.

The invention has been described with reference to the preferred embodiments. Obviously, modifications and alterations will occur to others upon a reading and understanding of the preceding detailed description. It is intended that the invention be construed as to include all such alterations and modifications insofar as they come within the scope of the claims and the equivalents thereof.

Having thus described the preferred embodiments, the invention is now claimed to be:

1. A golf ball comprising a core and a cover, wherein said cover comprises a blend of two or more high acid ionomer resins wherein each ionomer resin comprises a copolymer of greater than 16% by weight of an alpha, beta-unsaturated carboxylic acid, and an alpha olefin of which about 10 to about 90% of the carboxyl groups of the copolymer are neutralized with a metal cation, wherein the core has a Riehle compression of at least 0.075 inches and the cover has a Shore D hardness of at least 65.

2. The golf ball of claim 1, wherein the carboxylic acid groups of one of the ionomer resins are partially neutralized by sodium ions.

3. The golf ball of claim 1, wherein the carboxylic acid group of one of the ionomer resins are partially neutralized by zinc ions.

4. The golf ball of claim 1, wherein the carboxylic acid group of one of the ionomer resins are partially neutralized by magnesium ions.

5. A golf ball, as set forth in claim 1, wherein the core is comprised of polybutadiene, at least one metallic salt of an unsaturated carboxylic acid and a free radical initiator.

6. The golf ball according to claim 1, wherein said cover comprises a blend of two or more ionomer resins, each ionomer resin comprising from about 17% to about 25% by weight of a carboxylic acid.

7. The golf ball according to claim 1, wherein said cover comprises a blend of two or more ionomer resins, each ionomer resin comprising from about 18.5% to about 21.5% by weight of a carboxylic acid.

8. The golf ball of claim 7, wherein the carboxylic acid groups of one of the ionomer resins are partially neutralized by sodium ions.

9. The golf ball of claim 7, wherein the carboxylic acid group of one of the ionomer resins are partially neutralized by zinc ions.

10. The golf ball of claim 7, wherein the carboxylic acid group of one of the ionomer resins are partially neutralized by magnesium ions.

11. A golf ball, as set forth in claim 1, wherein the cover has a thickness greater than 0.0675 inches.

12. A golf ball, as set forth in claim 1, wherein the cover has a thickness of about 0.0675 to about 0.130 inches.

13. A golf ball, as set forth in claim 1, wherein the golf ball has a diameter of about 1.680 to about 1.800 inches.

14. A golf ball, as set forth in claim 1, wherein the golf ball has a diameter of about 1.710–1.730 inches.

15. A golf ball, as set forth in claim 1, wherein the golf ball has a diameter of about 1.717–1.720 inches.

16. A molded golf ball comprising a core and a cover wherein said core has a Riehle compression of about 0.075 to about 0.115 inches, and wherein said cover is comprised of a blend of two or more high acid ionomer resins wherein each ionomer resin comprises a copolymer of greater than 16% by weight of an alpha, beta-unsaturated carboxylic acid, and an alpha olefin of which about 10 to about 90% of the carboxyl groups of the copolymer are neutralized with a metal cation further wherein the cover has a Shore D hardness of at least 65 and a thickness of about 0.0675 to 0.130 inches.

17. A golf ball comprising a core and a cover, wherein said core has a Riehle compression of at about 0.075 inches and wherein said cover comprises a blend of a first ethylene-methacrylic acid copolymer containing greater than 16% by weight methacrylic acid having from about 10 to about 75% of the carboxylic acid groups neutralized with sodium zinc or magnesium ions, and a second ethylene-methacrylic acid copolymer containing greater than 16% by weight methacrylic acid having from about 10 to about 75% of the carboxylic acid groups neutralized by an ion different from the first ethylene-methacrylic acid copolymer selected from the group consisting of sodium, zinc and magnesium further wherein the cover has a Shore D hardness of at least 65.

18. The golf ball of claim 17 wherein the first copolymer is neutralized by sodium and the second copolymer is neutralized by magnesium.

19. The golf ball of claim 17 wherein the first copolymer is neutralized by zinc and the second copolymer is neutralized by magnesium.

* * * * *